United States Patent
Panchaksharaiah et al.

(10) Patent No.: US 10,382,829 B1
(45) Date of Patent: Aug. 13, 2019

(54) SYSTEMS AND METHODS FOR PROMPTING A USER TO VIEW AN IMPORTANT EVENT IN A MEDIA ASSET WHEN THE USER IS USING ANOTHER APPLICATION

(71) Applicant: Rovi Guides, Inc., San Jose, CA (US)

(72) Inventors: Vishwas Sharadanagar Panchaksharaiah, Karnataka (IN); Vikram Makam Gupta, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/933,720

(22) Filed: Mar. 23, 2018

(51) Int. Cl.
| | |
|---|---|
| *H04H 60/33* | (2008.01) |
| *H04N 7/173* | (2011.01) |
| *H04N 21/488* | (2011.01) |
| *H04N 21/435* | (2011.01) |
| *H04N 21/472* | (2011.01) |
| *H04N 21/45* | (2011.01) |
| *H04N 21/442* | (2011.01) |

(52) U.S. Cl.
CPC ....... *H04N 21/4882* (2013.01); *H04N 21/435* (2013.01); *H04N 21/44213* (2013.01); *H04N 21/4532* (2013.01); *H04N 21/47217* (2013.01)

(58) Field of Classification Search
None
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,484,676 B1 * | 7/2013 | Narsimhan | H04N 21/4126 348/734 |
| 9,075,883 B2 * | 7/2015 | Verkasalo | G06Q 10/06 |
| 9,491,507 B2 * | 11/2016 | Hayashida | H04N 21/44218 |
| 9,538,219 B2 * | 1/2017 | Sakata | H04N 17/04 |
| 9,681,165 B1 | 6/2017 | Gupta et al. | |
| 9,805,378 B1 * | 10/2017 | Wei | H04N 21/26233 |
| 9,866,916 B1 * | 1/2018 | Boss | H04N 21/4852 |
| 9,955,428 B1 * | 4/2018 | Bacarella | H04W 52/0258 |
| 10,110,950 B2 * | 10/2018 | Abou Mahmoud | H04N 21/4532 |
| 2002/0174430 A1 | 11/2002 | Ellis et al. | |

(Continued)

*Primary Examiner* — William J Kim
(74) *Attorney, Agent, or Firm* — Haley Guiliano LLP

(57) ABSTRACT

Systems and methods are described herein for a media guidance application on a first device that detects a user's engagement with a second device, and alerts the user to an important event in the media asset, thereby reminding the user to view the media asset presented on the first device. The media guidance application may determine when the next important event will occur in the media asset and determine an estimated usage time of the second device based on the application with which the user is engaged on the second device. Depending on the estimated usage time and the time of the next important event in the media asset, the media guidance application may restrict the amount of content presented to the user on the second device so that the user will end his or her engagement with the second device prior to the important event.

20 Claims, 15 Drawing Sheets

(56) References Cited

U.S. PATENT DOCUMENTS

| | | | |
|---|---|---|---|
| 2003/0023977 A1* | 1/2003 | Brown | H04N 7/163 725/58 |
| 2005/0143175 A1* | 6/2005 | Ahlquist | A63F 13/10 463/42 |
| 2005/0251827 A1 | 11/2005 | Ellis et al. | |
| 2007/0147794 A1* | 6/2007 | Araki | G11B 20/10 386/332 |
| 2009/0312072 A1* | 12/2009 | Hong | G01R 31/367 455/573 |
| 2010/0151918 A1* | 6/2010 | Annambhotla | G01R 31/3648 455/573 |
| 2010/0153885 A1 | 6/2010 | Yates | |
| 2011/0071893 A1* | 3/2011 | Malhotra | G06Q 10/109 705/14.23 |
| 2012/0047498 A1* | 2/2012 | Motta | G06F 8/65 717/171 |
| 2012/0057039 A1* | 3/2012 | Gardiner | H04N 5/23219 348/222.1 |
| 2012/0177101 A1 | 7/2012 | van der Schaar | |
| 2013/0014136 A1* | 1/2013 | Bhatia | H04N 21/252 725/9 |
| 2013/0145384 A1* | 6/2013 | Krum | G06Q 30/02 725/10 |
| 2013/0222271 A1* | 8/2013 | Alberth | G06F 1/163 345/173 |
| 2014/0078039 A1* | 3/2014 | Woods | H04N 21/4223 345/156 |
| 2014/0115146 A1* | 4/2014 | Johnson | H04L 43/0876 709/224 |
| 2016/0295429 A1* | 10/2016 | Enqvist | H04W 4/02 |
| 2016/0300153 A1* | 10/2016 | Verma | H04W 4/70 |
| 2016/0316233 A1 | 10/2016 | Ghadi et al. | |
| 2017/0090535 A1* | 3/2017 | Jeyapaul | G06F 1/26 |
| 2018/0095707 A1* | 4/2018 | Sato | G06F 3/011 |
| 2018/0295096 A1* | 10/2018 | Uysal | H04L 61/1511 |

* cited by examiner

SYSTEMS AND METHODS FOR PROMPTING A USER TO VIEW AN IMPORTANT EVENT IN A MEDIA ASSET WHEN THE USER IS USING ANOTHER APPLICATION

BACKGROUND

There are many media devices available to users, each capable of providing media content, as well as other content such as social network content, messaging, and other interactive content. Additionally, many of these devices alert users when new content is available and/or when a message is received. This may result in users watching a media asset on a first device becoming distracted from the media asset on the first device by content or messages on a second device. If a user becomes too distracted or engrossed in the content provided by the second device, the user may miss important parts of the media asset on the first device.

SUMMARY

The advancement of digital transmission of media content has increased the amount of data that can be transmitted. In particular, media systems may transmit metadata that includes detailed information about media content. This metadata may include descriptions and tags to important events within the media asset. While this information, by itself, is not useable for displaying to a human user, computer processors can read and interpret this information. However, while computer processors may read and interpret this information, and generate media content for display that may be useable by a human user (e.g., output media content on a display screen in a human recognizable format), these systems still fail to solve the aforementioned problem when implemented in computer systems because an alert generated by the computer processor based on received metadata, still fails to account for the problems created when alerting a user in computer systems: (i) that a user may be using a different device (and may not see an alert output on that device); and (ii) that a user may be currently consuming media content on the second device and may not wish, or be able to, immediately end consumption of the media content on the second device.

Accordingly, to overcome the problems created when alerting a user in computer systems, systems and methods are described herein for a media guidance application that detects, and responds to, a user's engagement with a second device while consuming media content on a first device. Specifically, the media guidance application detects metadata associated with the media content on the first device indicating an important event is about to occur (e.g., a predetermined time in the future based on the characteristics of the user and circumstances of the user's use of the second device). In response, the media guidance application transmits an instruction to generate for display an alert on the second device the predetermined amount of time before the important event in the media content on the first device. Accordingly, the user may receive the alert even if the user is not viewing the first device and will have enough time to end his or her consumption of media content on the second device prior to the important event on the first device.

For example, the media guidance application may determine (e.g., using control circuitry on the first device) when the next important event will occur in the media asset (e.g., via reading and interpreting metadata received with the media asset) and determine an estimated usage time of the second device based on the application with which the user is engaged on the second device (e.g., via reading and interpreting data received from the second device). The media guidance application may, depending on the estimated usage time and the time of the next important event in the media asset, generate an alert or perform other actions (e.g., restrict the amount of content presented to the user on the second device so that the user will end his or her engagement with the second device prior to the important event) at an appropriate time.

As an example, the user may be watching the movie "Star Wars" on the first device. During the movie, the user may access a second device to view social content on a social media application. The media guidance application may determine that the social media application is in use on the second device, and estimate an amount of time the user will spend using the social media application. For example, the media guidance application may access an application usage history of the second device to determine how much time the user usually spends using the social media application. As another example, the media guidance application may determine an amount of new content available in the social media application and estimate an amount of time the user will spend using the social media application by estimating the amount of time the user will spend for each new content item. The media guidance application may determine when the next important event in the movie occurs. For example, the media guidance application may access metadata of the movie "Star Wars" and determine that the next important event (e.g., the death of Obi-Wan Kenobi at the hands of Darth Vader) will occur in five minutes. The media guidance application may compare this time with the estimated usage time. If the estimated usage time is longer than five minutes, the media guidance application may present an alert on the second device over five minutes prior to the event, so that the user may end his or her consumption on the second device prior to the important event. Accordingly, the user is given a chance to both end his or her consumption on the second device (and reminded not to start consuming more content on the second device) and resume viewing the media asset on the first device in order to not miss the important event.

In some aspects, the media guidance application may generate for display, at a first device, a media asset. For example, the media guidance application may generate for display the movie "Star Wars" on the first device. "Star Wars" may be generated for display from a broadcast stream received at the first device, or from a recording stored in a memory of the first device.

The media guidance application may determine that the user has stopped viewing a media asset on the first device to access an application on the second device. For example, the media guidance application may reside on the first device and communicate with the second device through a wired or wireless connection. The media guidance application may receive data from the second device indicating user input, an active application, or any other suitable metric related to use of the second device. By communicating back and forth, the two devices share information that helps estimate usage times and determine when to alert the user.

The media guidance application may retrieve, from the second device, an indication of an amount of content in the application. For example, the media guidance application may, through the connection with the second device, request from the second device a summary of content available in the active application with which the user is interacting. For example, if the user is interacting with a Facebook® application, the media guidance application may request from the second device an indication of an amount of new content in the Facebook® application. Once again by communicating back and forth, the two devices share information that helps estimate usage times and determine when to alert the user.

The media guidance application may retrieve, from the second device, an indication of an average usage time for the application. For example, the second device may maintain a log of applications available on the second device, and the amount of time the user interacts with each application. The media guidance application may access the log on the second device and calculate an average time that the user interacts with the application currently in use. For example, the log may indicate that the last three times the user accessed the Facebook® application, the user interacted with the application for two minutes, three minutes, and one and a half minutes, respectively. The media guidance application may calculate an average usage time for the Facebook® application of two minutes and ten seconds. The media guidance application may calculate an estimated usage time for the application on the second device based on the amount of content on the application and the average usage time for the application. By calculating the average usage time (or other appropriate estimation), the media guidance application can give the user a likely amount of time to both end his or her consumption on the second device and resume viewing the media asset on the first device without missing the important event.

The media guidance application may access metadata of the media asset and determine, based on the metadata, a playback time of an important event in the media asset. For example, the media guidance application may search metadata of the media asset on the first device for a metadata flag in the metadata indicating a time of an important event in the media asset. For example, the metadata may include data fields comprising an index of important events. As another example, the metadata may include data fields indicating the importance of the event represented in the current scene, or in the next scene. By retrieving this information, the media guidance application may identify upcoming important events.

The media guidance application may determine a threshold amount of time until playback of the important event based on a current playback time and the playback time of the important event. For example, the metadata may include a timestamp of the important event, or may include a relative amount of time from the current playback time to the important event. The media guidance application may calculate the amount of time between the current playback time and the playback time of the important event. By determining this threshold, the media guidance application may identify upcoming important events prior to their occurrence.

The media guidance application may determine that the estimated usage time is greater than the threshold amount of time. For example, the media guidance application may compare the threshold amount of time with the estimated usage time. For example, the user may be using a social media application, and the media guidance application may estimate the usage time as five minutes. The media guidance application may also determine that the threshold amount of time until the next important scene is three minutes. The media guidance application may therefore determine that the estimated usage time is greater than the threshold amount of time. In response to determining that the estimated usage time is greater than the threshold amount of time, the media guidance application may generate for display on the second device an alert, prompting the user to view the media asset on the first device. For example, the media guidance application may instruct the second device to display a pop-up message reminding the user to watch "Star Wars" on the first device because an important scene is coming soon. By using these thresholds, the media guidance application can ensure that alerts are generated at an appropriate time (e.g., prior to an important event, but not too far ahead of the event such that the user's use of the second device is unnecessarily restricted).

In some embodiments, the media guidance application may, when retrieving the indication of the amount of content in the application, access a memory of the second device related to the application. For example, the media guidance application may access a memory of the second device related to the Facebook® application and extract an indication of the amount of new content available. The media guidance application may determine, from the memory, an amount of content added to the application within a threshold amount of time. For example, the media guidance application may analyze the memory of the second device related to the Facebook® application and determine that an amount of content has been added to the application in the last thirty minutes. The media guidance application may retrieve, as the indication of the amount of content in the application, the amount of content added in the threshold amount of time. By using this information about the amount of content in the application on the device, the media guidance application may determine accurate estimated usage times that are particular to both the application and use of the application on that particular device.

In some embodiments, the media guidance application may, when retrieving the indication of the average usage time for the application, access a memory of the second device related to application usage. For example, an application usage log of the second device may also record an amount of content consumed in each application each time the user interacted with the application. The media guidance application may calculate an estimated usage time based on the amount of new content detected in the application by calculating, from the usage log, an average amount of usage time per unit of content, and applying the average amount to the amount of detected new content. The media guidance application may retrieve, as the indication of the average usage time, the average amount of time per unit of content. By using this information about the usage of an application stored in the memory of the device, the media guidance application may determine accurate estimated usage times that are particular to both the application and use of the application on that particular device.

In some embodiments, the media guidance application may, when determining, based on metadata, a playback time of an important event in the media asset, access a database of playback times corresponding to important events in the media asset. The playback times may be relative to the start of the media asset, or may be actual times based on the time at which playback of the media asset began. For example, a database for "Star Wars" may indicate important events at ten minutes, twenty-five minutes, fifty-three minutes, and eighty-four minutes from the start of the movie. The media guidance application may determine, based on the current playback time, the next important event in the media asset in the database. For example, if the current playback time for "Star Wars" is forty-seven minutes, the media guidance application may determine that the next important event occurs at fifty-three minutes, and retrieve fifty-three minutes as the playback time of the next important event. By determining this threshold, the media guidance application may identify upcoming important events prior to their occurrence.

In some embodiments, the user may stop viewing the media asset on the first device in response to a notification (e.g., specifically selected based on the circumstances) on the second device. The media guidance application may identify an application associated with the notification. For example, the media guidance application may access a memory of the second device related to notifications and determine which application generated the most recent notification. The media guidance application may access a database of applications that relates each application with an application type indicating a level of importance to the user. For example, an application with a type "GAME" may have low importance to the user, while an application with a type "SOCIAL" may have high importance to the user. The media guidance application may retrieve from the database the type of the identified application and determine the level of importance to the user. In response to determining that the level of importance exceeds a threshold, the media guidance application may pause the media asset on the first device. For example, if the application has a type indicating high importance to the user, the media guidance application may pause the media asset. In response to the user completing use of the application, the media guidance application may resume playback of the media asset. For example, the media guidance application may detect when the user has closed the application, or has otherwise stopped interacting with the application, and resume playing the media asset. By generating notifications specifically selected based on the circumstances, the media guidance application may present the user with information that may help tailor his or her consumption on either device. For example, the notification may include information that helps the user determine how important an event is and/or whether or not he or she wishes to prematurely end his or her consumption of content on the second device.

In some embodiments, when calculating the estimated usage time for the application, the media guidance application may access a memory of the second device related to application usage history and identify a plurality of applications having an importance level within a threshold difference of the importance level of the identified application. The media guidance application may calculate an average usage time for the plurality of applications as an indication of average usage time for the identified application. By using this information about the usage of an application stored in the memory of the device, the media guidance application may determine accurate estimated usage times that are particular to both the application and use of the application on that particular device.

In some embodiments, the user may stop viewing the media asset on the first device in response to a plurality of notifications on the second device and while the current playback time of the media asset corresponds to an advertisement slot. The media guidance application may calculate an estimated usage time for the application associated with each notification of the plurality of notifications. The media guidance application may determine, based on metadata of the media asset, an amount of time until the end of the advertisement slot. The media guidance application may select a subset of notifications to present to the user on the second device having a combined average usage time that is less than the amount of time between the current playback time and the end of the advertisement slot. The media guidance application may present the subset of notifications on the second device while simultaneously preventing display of the remainder of the plurality of notifications. By using this information, the media guidance application may determine estimated usage times that are keyed to advertisements on the first device, the viewing of which may not be desirable to the user.

In some embodiments, the media guidance application may update the estimated usage time by detecting new content received in the application while the user is interacting with the application. For example, the user may be interacting with a Facebook® application and new content items may become available while the user is viewing other content in the application. The media guidance application may add an amount of time to the estimated usage time based on the amount of detected new content. By using this information, the media guidance application may continually update the estimated usage time based on the actions of the user on the second device and the likelihood that the estimated usage time may increase.

In some embodiments, to generate for display the alert on the second device, the media guidance application may calculate an alert time, based on the playback time of the important event. For example, playback time of the important event may occur in five minutes. The media guidance application may have a threshold alert time of two minutes prior to an important event, and may calculate the alert time to occur in three minutes. The media guidance application may monitor a real-time clock to determine when the alert time has arrived.

In some aspects, the media guidance application may determine that a user has stopped viewing a first media asset on a first device to access a second media asset on a second device. For example, the user may be watching "Star Wars" on a first device, and begin watching another media asset on YouTube® on a second device. For example, the media guidance application may receive data from the second device indicating an active media presentation application, or any other suitable metric related to presentation of media assets on the second device. Again, by communicating back and forth, the two devices share information that helps estimate usage times and determine when to alert the user.

The media guidance application may determine the length of time required to play back the second media asset on the second device. For example, the media guidance application may access metadata of the second media asset to determine the duration of the second media asset. Metadata of the second media asset may be located on the second device. Again, by communicating back and forth, the two devices share information that helps estimate usage times and determine when to alert the user.

The media guidance application may access metadata of the first media asset and determine, based on the metadata, a playback time of an important event in the first media asset. For example, the media guidance application may search metadata of the media asset on the first device for a metadata flag in the metadata indicating a time of an important event in the media asset. For example, the metadata may include data fields comprising an index of important events. As another example, the metadata may include data fields indicating the importance of the event represented in the current scene, or in the next scene. Again, by retrieving this information, the media guidance application may identify upcoming important events.

The media guidance application may determine a threshold amount of time until playback of the important event based on a current playback time and a playback time of the important event. For example, the metadata may include a timestamp of the important event, or may include a relative amount of time from the current playback time to the important event. The media guidance application may calculate the amount of time between the current playback time and the playback time of the important event. By determining this threshold, the media guidance application may identify upcoming important events prior to their occurrence.

The media guidance application may compare the length of time required to play back the second media asset with the threshold amount of time. If the media guidance application determines that the length of time required to play back the second media asset is greater than the threshold amount of time, the media guidance application may generate an alert on the second device reminding the user to view the first media asset. By using these thresholds, the media guidance application can ensure that alerts are generated at an appropriate time (e.g., prior to an important event, but not too far ahead of the event such that the user's use of the second device is unnecessarily restricted).

In some embodiments, to determine that the user has stopped viewing the first media asset on the first device to view a second media asset on the second device, the media guidance application may determine a state of the second device indicating whether there is user interaction with the second device. For example, the media guidance application may access a memory or sensor of the second device to determine if the second device is currently receiving user input. If the media guidance application determines that the user is interacting with the second device, the media guidance application may determine a type of application associated with the user interaction. For example, the media guidance application may access a memory of the second device to determine which application is currently active, or to which application the user inputs are being directed. The media guidance application may further determine, based on the application type, that the application is a media asset presentation application, such as YouTube®. Once again, by communicating back and forth, the two devices share information that helps estimate usage times and determine when to alert the user.

In some embodiments, to determine the length of time required to play back the second media asset, the media guidance application may access an asset memory of the second device related to the second media asset. The media guidance application may determine, from the asset memory, the length of the second media asset. By using this information about the length of content on the second device, the media guidance application may determine accurate estimated usage times on the second device.

In some embodiments, to determine the length of time required to play back the second media asset, the media guidance application may access an asset memory of the second device related to the media asset. For example, the media guidance application may access a memory of the second device related to a media asset being watched on the YouTube® application. The media guidance application may identify from the memory a source of the media asset. For example, the media guidance application may retrieve a URL for the media asset. The media guidance application may access the source of the second media asset directly and retrieve the length of the second media asset. For example, the media guidance application may access a YouTube® server location and retrieve metadata of the second media asset from the server location indicating the length of the second media asset. Again, by using this information about the length of content on the second device, the media guidance application may determine accurate estimated usage times on the second device.

In some embodiments, the media guidance application may access a network interface of the second device through which the second device is receiving the second media asset and determine the download rate of the second media asset. For example, the media guidance application may determine that the second media asset is being downloaded at a rate of 1 Mbps. The media guidance application may determine the bitrate of the second media asset and compare the bitrate with the download rate to determine if the download rate is sufficient for uninterrupted playback of the second media asset. For example, if the download rate is 1 Mbps, and the bitrate of the second media asset is 500 kbps, half the download rate, then the media guidance application may determine that the download rate is sufficient for uninterrupted playback of the second media asset. However, if, for example, the bitrate of the second media asset is 2 Mbps while the download rate is only 1 Mbps, then the media guidance application may determine that the download rate is not sufficient for uninterrupted playback of the second media asset. The media guidance application may then calculate an estimated amount of additional time required for playback of the second media asset, and combine the estimated amount of additional time with the length of the second media asset. By communicating back and forth, the two devices share information that helps revise estimated usage times and determine when to alert the user.

In some embodiments, the media guidance application may determine, from the asset memory or the source of the second media asset, a plurality of advertisement slots included in the second media asset. For example, the second media asset may include three pointers to advertisements over the duration of the asset. The media guidance application may access an application memory related to the application of the second device in which the second media asset is being played back and determine an average length of an advertisement slot. For example, the application memory of the YouTube® application may include a log file or other data relating to past advertisements shown to the user during other media assets, and may include the duration of each advertisement. The media guidance application may calculate an average length of an advertisement slot. The media guidance application may calculate, based on the average length of an advertisement slot, an estimated amount of additional time required for playback of the plurality of advertisement slots, and combine the estimated amount of additional time with the length of the second media asset. Again, by communicating back and forth, the two devices share information that helps revise estimated usage times and determine when to alert the user.

It should also be noted that the systems and/or methods described above may be applied to, or used in accordance with, other systems and/or methods.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for a media guidance application that detects a user's engagement with a second device, and alerts the user to an important event in the media asset being presented on a first device, thereby reminding the user to view the media asset presented on the first device. The media guidance application may determine when the next important event will occur in the media asset and determine an estimated usage time of the second device based on the application with which the user is engaged on the second device. The media guidance application may, depending on the estimated usage time and the time of the next important event in the media asset, restrict the amount of content presented to the user on the second device so that the user will end his or her engagement with the second device prior to the important event.

As an example, the user may be watching the movie "Star Wars" on the first device. During the movie, the user may access a second device to view social content on a social media application. The media guidance application may determine that the social media application is in use on the second device, and estimate an amount of time the user will spend using the social media application. For example, the media guidance application may access an application usage history of the second device to determine how much time the user usually spends using the social media application. As another example, the media guidance application may determine an amount of new content available in the social media application and estimate an amount of time the user will spend using the social media application by estimating the amount of time the user will spend for each new content item. The media guidance application may determine when the next important event in the movie occurs. For example, the media guidance application may access metadata of the movie "Star Wars" and determine that the next important event (e.g., the death of Obi-Wan Kenobi at the hands of Darth Vader) will occur in five minutes. The media guidance application may compare this time with the estimated usage time. If the estimated usage time is longer than five minutes, the media guidance application may present an alert on the second device that the user may soon miss an important event.

Figure 1:
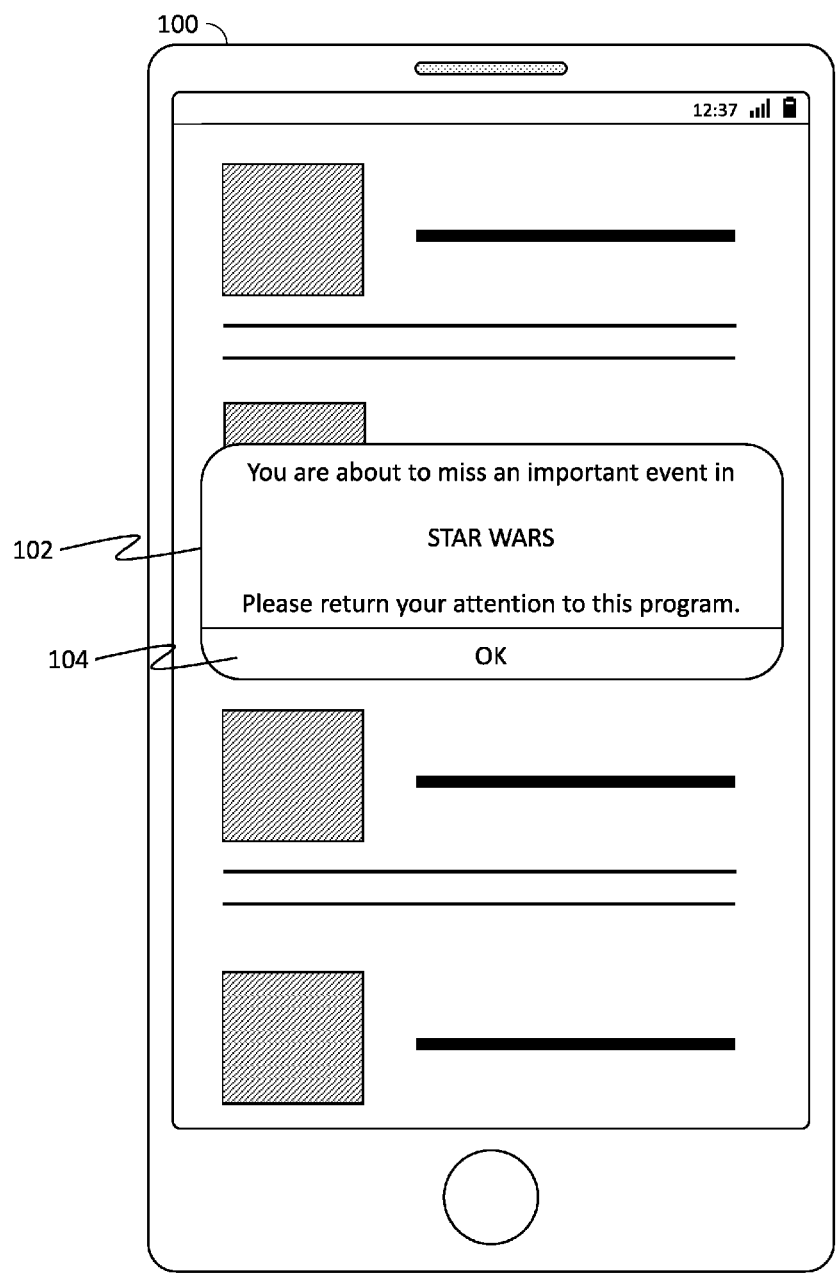
FIG. 1 shows an exemplary display of a second device and exemplary alerts according to an embodiment of the disclosure.
Figure 1:
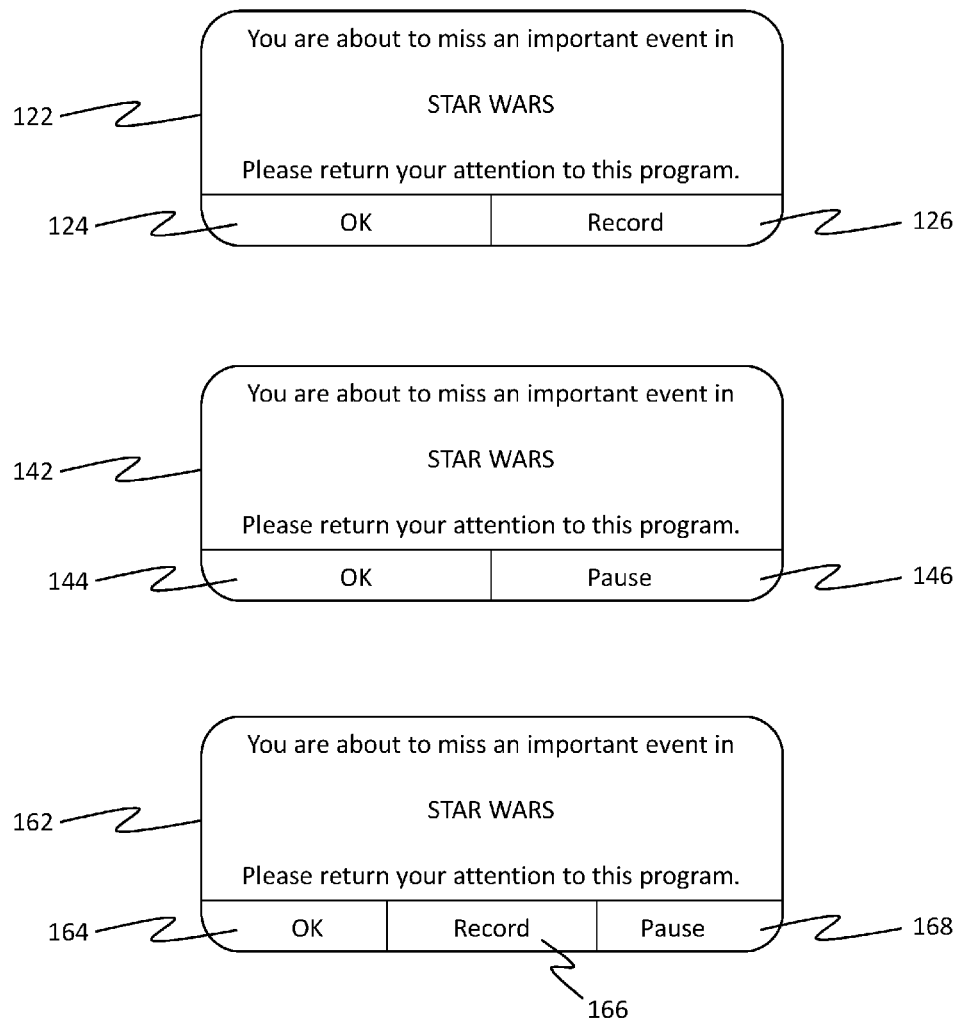

FIG. 1 shows an exemplary second device 100 and several exemplary alerts generated by the media guidance application for display on the second device 100. In some embodiments, the media guidance application may generate for display, at a first device, a media asset. For example, the media guidance application may generate for display the movie "Star Wars" on the first device. "Star Wars" may be generated for display from a broadcast stream received at the first device, an over-the-top streaming application on the first device, or from a recording stored in a memory of the first device.

The media guidance application may determine that the user has stopped viewing a media asset on the first device to access an application on the second device. For example, the media guidance application may reside on the first device and communicate with the second device 100 through a wired connection, such as Ethernet, or wireless connection, such as IEEE 802.11a/b/g/n ("WiFi"), Bluetooth, Near Field Communication ("NFC"), radio, or any other suitable wireless communication protocol. The media guidance application may receive data from the second device 100 indicating user input, an active application, or any other suitable metric related to use of the second device 100. For example, the second device 100 may maintain a variable, flag, or other data structure indicating a state of a user input device of the second device 100. If the second device 100 is currently receiving input from the user input device, the variable, flag, or data structure may be set to indicate that the user input device is active. The media guidance application may request or access the variable, flag, or data structure to retrieve the current state of the input device. The second device 100 may also maintain a variable, flag, or data structure indicating a state of an output device of the second device 100. For example, if the second device 100 is currently outputting video or audio content, the variable, flag, or other data structure may be set to indicate that an output device is active. The media guidance application may request or access the variable, flag, or data structure to retrieve the current state of the output device.

The media guidance application may retrieve, from the second device 100, an indication of an amount of content in the application. For example, the second device 100 may maintain a log file, database, or other data structure in which the second device 100 records information related to content received by the second device 100 that has not yet been viewed or accessed by the user of the second device 100. For example, the second device 100 may receive ten new content items from a server related to a Facebook® application and record in the log file, database, or other data structure an indication that ten content items were received for presentation through the Facebook® application. The media guidance application may, through the connection with the second device 100, request or access, from the second device 100, the log file, database or data structure of content available in the active application with which the user is interacting. For example, if the user is interacting with a Facebook® application, the media guidance application may request from the second device 100 an indication of an amount of new content in the Facebook® application. Once the content items have been accessed, the second device 100 may update the log file, database, or data structure to remove reference to the content items, or to mark such content items as already having been viewed or accessed.

The media guidance application may retrieve, from the second device 100, an indication of an average usage time for the application. For example, the second device 100 may maintain a log file, database, or other data structure listing applications available on the second device 100, along with the amount of time the user interacts with each application. For example, the second device 100 may record, in the log file, database, or data structure, each time an application is launched, an indication of the application, and the time at which the application was launched. When the user closes, exits, or otherwise leaves the application, the second device 100 may record the time at which the user closed, exited, or left the application. The second device 100 may then calculate and record a total usage time. For example, the log file, database, or data structure may indicate that the last three times the user accessed the Facebook® application, the user interacted with the application for two minutes, three minutes, and one and a half minutes, respectively. Alternatively, the media guidance application may calculate the total usage time upon requesting information related to the application from the log file, database, or data structure. The media guidance application may further calculate an average time that user interacts with the application. The media guidance application may calculate an average usage time for the Facebook® application of two minutes and ten seconds. Based on the calculated average usage time, the media guidance application may calculate an estimated usage time for the application on the second device based on the amount of content on the application and the average usage time for the application. For example, the log file, database, or data structure in which the second device 100 records usage time information may be the same log file, database or data structure in which the second device 100 records the amount of content received for each application. Alternatively, the log file, database, or data structure in which the second device 100 records usage information may contain references to entries in the log file, database, or data structure in which the second device 100 records content received for each application. The media guidance application may then divide the usage time for a particular application by the number of content items viewed or accessed during the particular use of the application to calculate an average usage time for each content item. The media guidance application may then multiply the average usage time for each content item by the number of new content items to be viewed or accessed.

The media guidance application may access metadata of the media asset on the first device and determine, based on the metadata, a playback time of an important event in the media asset. For example, the media guidance application may search metadata of the media asset on the first device for a metadata flag in the metadata indicating a time of an important event in the media asset. For example, the metadata may include data fields comprising an index of important events. As another example, the metadata may include data fields indicating the importance of the event represented in the current scene, or in the next scene. Alternatively, the media guidance application may access metadata of the media asset on a remote server. For example, the media guidance application may include a communication module which may allow communication with a remote media guidance data server.

The media guidance application may determine a threshold amount of time until playback of the important event based on a current playback time and the playback time of the important event. For example, the metadata may include a timestamp of the important event, or may include a relative amount of time from the current playback time to the important event. The media guidance application may calculate the amount of time between the current playback time and the playback time of the important event. Alternatively, the media guidance application may convert the current system time to an integer representing the current system time in Universal Time Code ("UTC") format. The media guidance application may also convert a broadcast time of the next important event to a UTC integer value. The media guidance application may then subtract the integer representing the current time from the integer representing the broadcast time of the next important event to determine the threshold amount of time. The media guidance application may store the threshold amount of time in a variable or other data structure.

The media guidance application may determine that the estimated usage time is greater than the threshold amount of time. For example, the media guidance application may compare the threshold amount of time with the estimated usage time. For example, the user may be using a social media application, and the media guidance application may estimate the usage time as five minutes. The media guidance application may also determine that the threshold amount of time until the next important scene is three minutes. The media guidance application may therefore determine that the estimated usage time is greater than the threshold amount of time.

In response to determining that the estimated usage time is greater than the threshold amount of time, the media guidance application may generate for display on the second device 100 an alert 102, 122, 142, or 162, prompting the user to view the media asset on the first device. For example, the media guidance application may instruct the second device 100 to display a pop-up message reminding the user to watch "Star Wars" on the first device because an important scene is coming soon. For example, the media guidance application may transmit a command to the second device 100 such as "ALERT [media_name]" where [media_name] is the title of the media asset being viewed on the first device, such as "Star Wars". Depending on the configuration of the media guidance application, the alert displayed on the second device 100 may include an option to record the media asset, such as options 126 and 166. The media guidance application may, alternatively or additionally, include in the alert an option to pause the media asset, such as option 146 and 168. The alert may also include an option such as options 124, 144, and 164, to dismiss the alert without taking any action. The command transmitted by the media guidance application may include an indication of which option or options to include in the alert. For example, the command may be "ALERT [media_name] [options]" where [options] is an indicator of the option or options to be included in the alert.

In some embodiments, the media guidance application may, when retrieving the indication of the amount of content in the application, access a memory of the second device 100 related to the application. For example, the media guidance application may access a memory of the second device 100 related to the Facebook® application and extract an indication of the amount of new content available. For example, the media guidance application may access the log file, database, or other data structure in which the second device 100 records content received for each application. The media guidance application may search the log file, database, or data structure for content related to the application with which the user is interacting. The media guidance application may determine an amount of content added to the application within a threshold amount of time. For example, the media guidance application may analyze entries in the log file, database, or data structure of the second device 100 related to the Facebook® application and determine that an amount of content has been added to the application in the last thirty minutes. The media guidance application may retrieve, as the indication of the amount of content in the application, the amount of content added in the threshold amount of time.

In some embodiments, the media guidance application may, when retrieving the indication of the average usage time for the application, access a memory of the second device related to application usage. For example, an application usage log of the second device 100 may also record an amount of content consumed in each application each time the user interacted with the application. The media guidance application may calculate an estimated usage time based on the amount of new content detected in the application by calculating, from the usage log, an average amount of usage time per unit of content, as described above, and applying the average amount to the amount of detected new content. The media guidance application may retrieve, as the indication of the average usage time, the average amount of time per unit of content.

In some embodiments, the media guidance application may, when determining, based on metadata, a playback time of an important event in the media asset, access a database of playback times corresponding to important events in the media asset. The database may be stored locally or may be stored on a remote server. The playback times may be relative to the start of the media asset or may be actual times based on the time at which playback of the media asset began. For example, a database for "Star Wars" may indicate important events at ten minutes, twenty-five minutes, fifty-three minutes, and eighty-four minutes from the start of the movie. The media guidance application may determine, based on the current playback time, the next important event in the media asset in the database. For example, if the current playback time for "Star Wars" is forty-seven minutes, the media guidance application may determine that the next important event occurs at fifty-three minutes, and retrieve fifty-three minutes as the playback time of the next important event. As another example, the database for a broadcast of "Star Wars" which began at 7:00 PM may indicate important events at 7:10 PM, 7:25 PM, 7:53 PM, and 8:24 PM. If the current time is 7:47 PM, the media guidance application may determine that the next important event occurs at 7:53 PM. The media guidance application may compare the current time with the times indicated in the database by first converting both times to a UTC integer value, or may compare the hour and minute values of the current time with those of the event times indicated in the database.

In some embodiments, the user may stop viewing the media asset on the first device in response to a notification on the second device 100. The media guidance application may identify an application associated with the notification. For example, the media guidance application may access a log file, database, or data structure of the second device 100 related to notifications, and determine which application generated the most recent notification. Alternatively, the media guidance application may determine, from the currently active application on the second device 100, the method through which the application was launched. For example, an application may be launched from a second application, by selection of the application, or by selection of a notification related to the application. The media guidance application may identify a type of application associated with the notification. For example, the media guidance application may access a database of applications that relates each application with an application type indicating a level of importance to the user. For example, an application with a type "GAME" may have low importance to the user, while an application with a type "SOCIAL" or "MESSAGING" may have high importance to the user. The importance to the user may be based on usage history of each application. For example, the second device 100 may record, as part of the usage history, an average amount of time between a notification from an application and the user's interaction with that application in response to the notification. Additionally, the second device 100 may record the type of interaction, such as a dismissal of the notification, usage of the application for only a short period of time, such as ten seconds, or usage of the application for a long period of time, such as one minute. Based on the above metrics, the second device 100 or the media guidance application may calculate a level of importance the user places on each application. The media guidance application may, from the above metrics, determine an importance level of the application related to the notification. The media guidance application may compare the importance level of the application with a threshold importance level. In response to determining that the level of importance exceeds a threshold, the media guidance application may pause the media asset on the first device. For example, if the application has a type indicating high importance to the user, the media guidance application may pause the media asset automatically. In response to the user completing use of the application, the media guidance application may resume playback of the media asset. For example, the media guidance application may detect when the user has closed the application, or has otherwise stopped interacting with the application, and resume playing the media asset.

In some embodiments, when calculating the estimated usage time for the application, the media guidance application may access a log file, database, or data structure of the second device 100 related to application usage history and identify a plurality of applications having an importance level within a threshold difference of the importance level of the identified application. The media guidance application may calculate an average usage time for the plurality of applications as an indication of average usage time for the identified application. For example, if the identified application has an importance level of "MEDIUM-HIGH" and there are three other applications of the same or similar importance level on the second device 100, the media guidance application may calculate an average usage time for the identified application that is an average taken of the average usage times of the three other applications of the same or similar importance level.

In some embodiments, the user may stop viewing the media asset on the first device in response to a plurality of notifications on the second device 100 while the current playback time of the media asset corresponds to an advertisement slot. For example, the user may have chosen to ignore notifications received on the second device 100 during the media asset, and chosen to review the notifications during an advertisement slot. The media guidance application may calculate an estimated usage time for the applications related to each respective notification of the plurality of notifications. For example, for three notifications, the media guidance application may calculate an average usage time for each respective application of one minute, thirty seconds, and two minutes. The media guidance application may determine, based on metadata of the media asset, an amount of time until the end of the advertisement slot. For example, metadata of the media asset may indicate that the advertisement slot is two minutes in length. The media guidance application may select a subset of notifications to present to the user on the second device having a combined average usage time that is less than the amount of time between the current playback time and the end of the advertisement slot. The media guidance application may present the subset of notifications on the second device, while simultaneously preventing display of the remainder of the plurality of notifications. The notifications selected to be presented may be further based on the importance level of each related application. For example, if the application with an average usage time of two minutes is of the highest importance level, the media guidance application may present only the notification for that application.

In some embodiments, the media guidance application may update the estimated usage time by detecting new content received in the application while the user is interacting with the application. For example, the user may be interacting with a Facebook® application and new content items may become available while the user is viewing other content in the application. The media guidance application may add an amount of time to the estimated usage time based on the amount of detected new content.

In some embodiments, to generate for display the alert 102, 122, 142, 162 on the second device 100, the media guidance application may calculate an alert time, based on the playback time of the important event. For example, playback time of the important event may occur in five minutes. The media guidance application may have a threshold alert time of two minutes prior to an important event, and may calculate the alert time to occur in three minutes. The media guidance applicant may monitor a real-time clock to determine when the alert time has arrived.

In some aspects, the media guidance application may determine that a user has stopped viewing a first media asset on a first device to access a second media asset on a second device 100. For example, the user may be watching "Star Wars" on a first device, and begin watching another media asset on YouTube® on a second device 100. The media guidance application may determine the length of time required to play back the second media asset on the second device 100. For example, the media guidance application may access metadata of the second media asset to determine the duration of the second media asset. The media guidance application may access metadata of the first media asset and determine a playback time of an important event in the first media asset. Based on the playback time of the important event, the media guidance application may determine a threshold amount of time until playback of the important event based on a current playback time and a playback time of the important event. The media guidance application may compare the length of time required to play back the second media asset with the threshold amount of time. If the media guidance application determines that the length of time required to play back the second media asset is greater than the threshold amount of time, the media guidance application may generate an alert 102, 122, 142, 162 on the second device 100 reminding the user to view the first media asset.

In some embodiments, to determine that the user has stopped viewing the first media asset on the first device to view a second media asset on the second device 100, the media guidance application may determine a state of the second device 100 indicating whether there is user interaction with the second device. For example, the media guidance application may access a memory or sensor of the second device 100 to determine if the second device 100 is currently receiving user input. If the media guidance application determines that the user is interacting with the second device 100, the media guidance application may determine a type of application associated with the user interaction. For example, the media guidance application may access a memory of the second device 100 to determine which application is currently active, or to which application the user inputs are being directed. The media guidance application may further determine, based on the application type, that the application is a media asset presentation application, such as YouTube®.

In some embodiments, to determine the length of time required to play back the second media asset, the media guidance application may access an asset memory of the second device 100 related to the second media asset. The media guidance application may determine, from the asset memory, the length of the second media asset. In some embodiments, to determine the length of time required to play back the second media asset, the media guidance application may access an asset memory of the second device 100 related to the second media asset, and may identify from the memory a source of the media asset. For example, the media guidance application may retrieve a URL for the media asset. The media guidance application may access the source of the second media asset directly and retrieve the length of the second media asset. For example, the media guidance application may access a YouTube® server location and retrieve metadata of the second media asset from the server location indicating the length of the second media asset.

In some embodiments, the media guidance application may access a network interface of the second device 100 through which the second device 100 is receiving the second media asset and determine the download rate of the second media asset. For example, the media guidance application may determine that the second media asset is being downloaded at a rate of 1 Mbps. The media guidance application may determine the bitrate of the second media asset and compare the bitrate with the download rate to determine if the download rate is sufficient for uninterrupted playback of the second media asset. For example, if the download rate is 1 Mbps, and the bitrate of the second media asset is 500 kbps, half the download rate, then the media guidance application may determine that the download rate is sufficient for uninterrupted playback of the second media asset. However, if, for example, the bitrate of the second media asset is 2 Mbps while the download rate is only 1 Mbps, then the media guidance application may determine that the download rate is not sufficient for uninterrupted playback of the second media asset. The media guidance application may then calculate an estimated amount of additional time required for playback of the second media asset, and combine the estimated amount of additional time with the length of the second media asset.

In some embodiments, the media guidance application may determine, from the asset memory or the source of the second media asset, a plurality of advertisement slots included in the second media asset. For example, the second media asset may include three pointers to advertisements over the duration of the asset. The media guidance application may access an application memory related to the application of the second device in which the second media asset is being played back and determine an average length of an advertisement slot. For example, the application memory of the YouTube® application may include a log file or other data relating to past advertisements shown to the user during other media assets, and may include the duration of each advertisement. The media guidance application may calculate an average length of an advertisement slot. The media guidance application may calculate, based on the average length of an advertisement slot, an estimated amount of additional time required for playback of the plurality of advertisement slots, and combine the estimated amount of additional time with the length of the second media asset.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
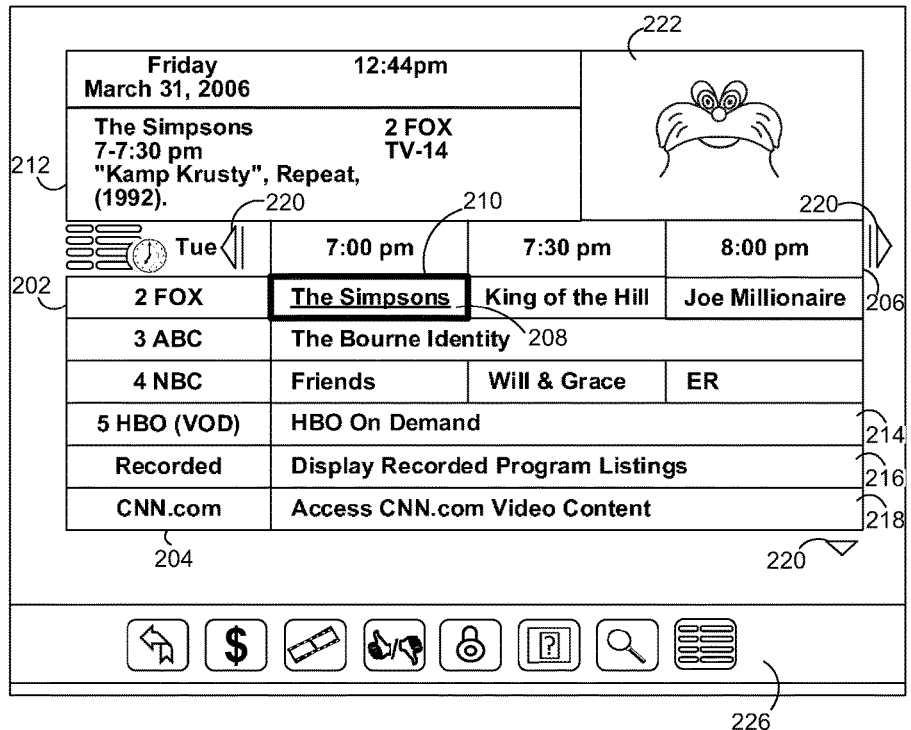
FIG. 2 shows an illustrative display screen that may be used to provide media guidance data according to an embodiment of the disclosure.
Figure 3:
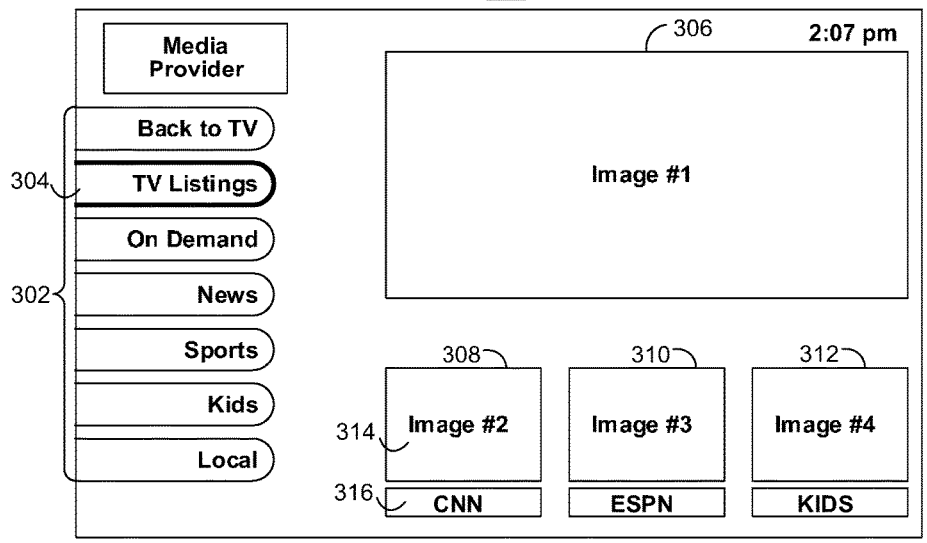
FIG. 3 shows an illustrative display screen that may be used to provide media guidance data according to an embodiment of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows an illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
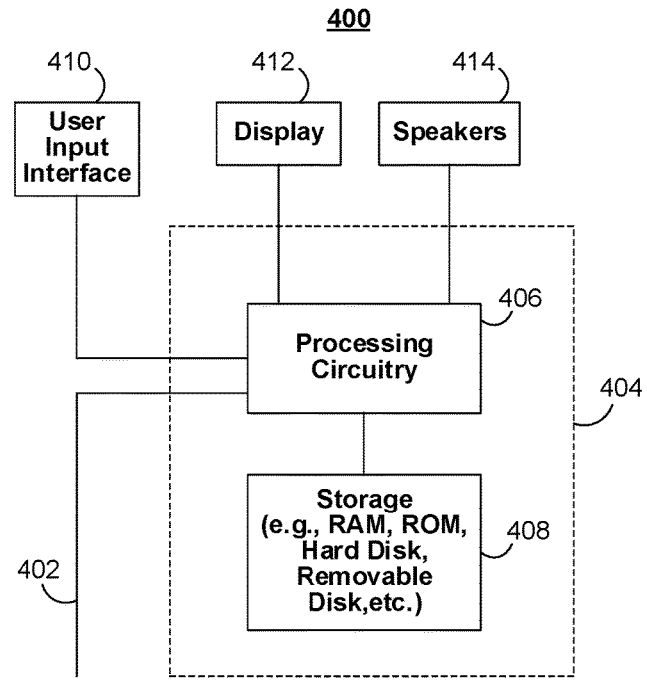
FIG. 4 shows a generalized embodiment of a stand-alone device according to an embodiment of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
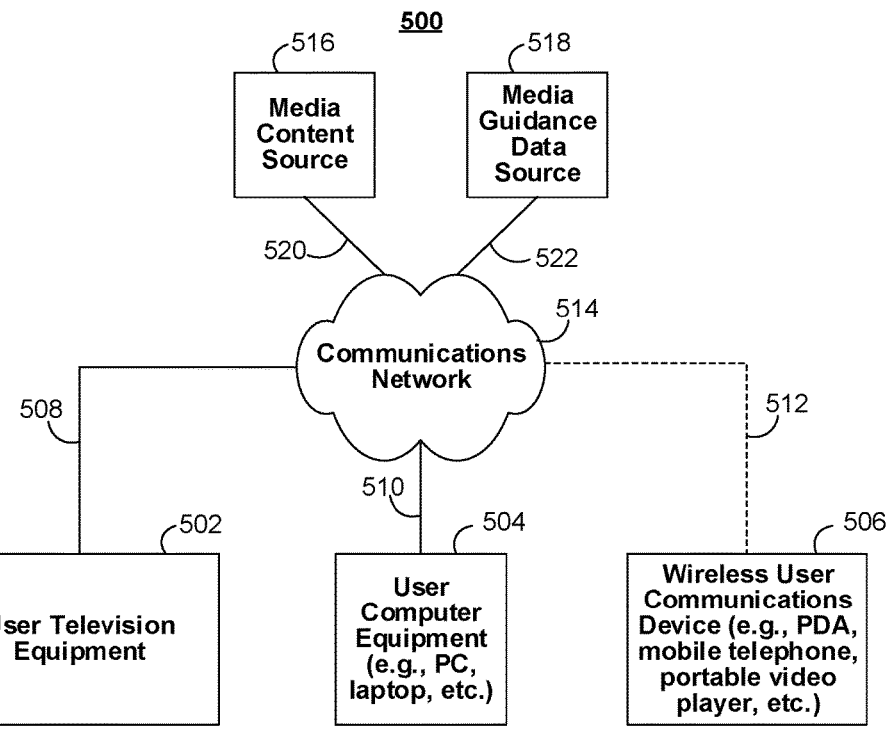
FIG. 5 shows a specific implementation of user devices according to an embodiment of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications networks or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
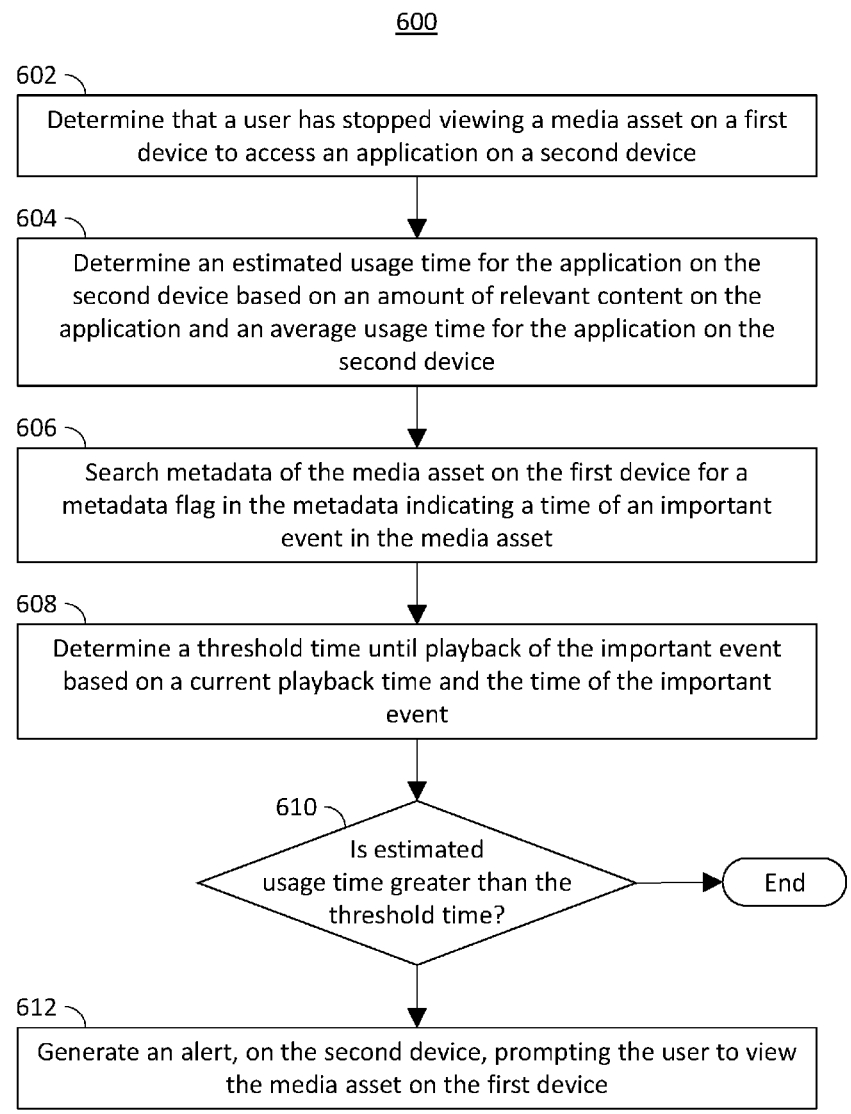
FIG. 6 is a flowchart representing a process for alerting a user to an important event in a media asset according to an embodiment of the disclosure.

FIG. 6 is a flowchart representing an illustrative process for alerting a user to an important event in a media asset in accordance with some embodiments of the disclosure. The flowchart in FIG. 6 represents a process 600 implemented on control circuitry 404 for alerting a user to an important event in a media asset according to an embodiment of the disclosure. It should be noted that process 600 or any action thereof could be performed on, or provided by, any of the devices shown in FIGS. 4-5. For example, process 600 may be executed by control circuitry 404 (FIG. 4) as instructed by a media guidance application implemented on a user device (e.g., user equipment devices 502, 504, and/or 506 (FIG. 5)) in order to alert a user to an important event in a media asset. In addition, one or more actions of process 600 may be incorporated into or combined with one or more actions of any other process or embodiment described herein.

At 602, control circuitry 404 may be configured to determine that the user has stopped viewing a media asset on the first device to access an application on the second device 100. For example, control circuitry 404 may communicate with the second device 100 through a wired connection, such as Ethernet, or wireless connection, such as IEEE 802.11a/b/g/n ("WiFi"), Bluetooth, Near Field Communication ("NFC"), radio, or any other suitable wireless communication protocol. Control circuitry 404 may receive data from the second device 100 indicating user input, an active application, or any other suitable metric related to use of the second device 100. For example, the second device 100 may maintain a variable, flag, or other data structure indicating a state of a user input device of the second device 100. If the second device 100 is currently receiving input from the user input device, the variable, flag, or data structure may be set to indicate that the user input device is active. Control circuitry 404 may request or access the variable, flag, or data structure to retrieve the current state of the input device. The second device 100 may also maintain a variable, flag, or data structure indicating a state of an output device of the second device 100. For example, if the second device 100 is currently outputting video or audio content, the variable, flag, or other data structure may be set to indicate that an output device is active. Control circuitry 404 may request or access the variable, flag, or data structure to retrieve the current state of the output device.

At 604, control circuitry 404 may be configured to determine an estimated usage time for the application on the second device 100 based on an amount of relevant content on the application, and an average usage time for the application on the second device 100. Control circuitry 404 may retrieve, from the second device 100, an indication of an amount of content in the application. For example, the second device 100 may maintain a log file, database, or other data structure in which the second device 100 records information related to content received by the second device 100 that has not yet been viewed or accessed by the user of the second device 100. For example, the second device 100 may receive ten new content items from a server related to a Facebook® application, and record in the log file, database, or other data structure an indication that ten content items were received for presentation through the Facebook® application. Control circuitry 404 may, through the connection with the second device 100, request or access, from the second device 100, the log file, database or data structure of content available in the active application with which the user is interacting. For example, if the user is interacting with a Facebook® application, control circuitry 404 may request from the second device 100 an indication of an amount of new content in the Facebook® application. Once the content items have been accessed, the second device 100 may update the log file, database, or data structure to remove reference to the content items, or to mark such content items as already having been viewed or accessed. Control circuitry 404 may retrieve, from the second device 100, an indication of an average usage time for the application. For example, the second device 100 may maintain a log file, database, or other data structure listing applications available on the second device 100, along with the amount of time the user interacts with each application. For example, the second device 100 may record, in the log file, database, or data structure, each time an application is launched, an indication of the application, and the time at which the application was launched. When the user closes, exits, or otherwise leaves the application, the second device 100 may record the time at which the user closed, exited, or left the application. The second device 100 may then calculate and record a total usage time. For example, the log file, database, or data structure may indicate that the last three times the user accessed the Facebook® application, the user interacted with the application for two minutes, three minutes, and one and a half minutes, respectively. Alternatively, control circuitry 404 may calculate the total usage time upon requesting information related to the application from the log file, database, or data structure. Control circuitry 404 may further calculate an average time that the user interacts with the application. Control circuitry 404 may calculate an average usage time for the Facebook® application of two minutes and ten seconds. Based on the calculated average usage time, control circuitry 404 may calculate an estimated usage time for the application on the second device based on the amount of content on the application and the average usage time for the application. For example, the log file, database, or data structure in which the second device 100 records usage time information may be the same log file, database or data structure in which the second device 100 records the amount of content received for each application. Alternatively, the log file, database, or data structure in which the second device 100 records usage information may contain references to entries in the log file, database, or data structure in which the second device 100 records content received for each application. Control circuitry 404 may then divide the usage time for a particular application by the number of content items viewed or accessed during the particular use of the application to calculate an average usage time for each content item. Control circuitry 404 may then multiply the average usage time for each content item by the number of new content items to be viewed or accessed.

At 606, control circuitry 404 may be configured to search metadata of the media asset on the first device for a metadata flag in the metadata indicating a time of an important event in the media asset. For example, control circuitry 404 may access metadata of the media asset and determine, based on the metadata, a playback time of an important event in the media asset. For example, the metadata may include data fields comprising an index of important events. As another example, the metadata may include data fields indicating the importance of the event represented in the current scene, or in the next scene. Alternatively, control circuitry 404 may access metadata of the media asset on a remote server, such as media guidance data source 518, via communications network 514.

At 608, control circuitry 404 may be configured to determine a threshold amount of time until playback of the important event, based on a current playback time and the playback time of the important event. For example, the metadata may include a timestamp of the important event, or may include a relative amount of time from the current playback time to the important event. Control circuitry 404 may calculate the amount of time between the current playback time and the playback time of the important event. Alternatively, control circuitry 404 may convert the current system time to an integer representing the current system time in Universal Time Code ("UTC") format. Control circuitry 404 may also convert a broadcast time of the next important event to a UTC integer value. Control circuitry 404 may then subtract the integer representing the current time from the integer representing the broadcast time of the next important event to determine the threshold amount of time. Control circuitry 404 may store the threshold amount of time in a variable or other data structure in, for example, storage 408.

At 610, control circuitry 404 may be configured to determine if the estimated usage time is greater than the threshold amount of time. For example, control circuitry 404 may compare the threshold amount of time with the estimated usage time. For example, the user may be using a social media application, and the media guidance application may estimate the usage time as five minutes. Control circuitry 404 may also determine that the threshold amount of time until the next important scene is three minutes. Control circuitry 404 may therefore determine that the estimated usage time is greater than the threshold amount of time.

At 612, in response to determining that the estimated usage time is greater than the threshold amount of time, control circuitry 404 may be configured to generate an alert 102, 122, 142, 162 on the second device 100, prompting the user to view the media asset on the first device. For example, control circuitry 404 may instruct the second device 100 to display a pop-up message reminding the user to watch "Star Wars" on the first device because an important scene is coming soon. For example, control circuitry 404 may transmit a command to the second device 100 such as "ALERT [media_name]" where [media_name] is the title of the media asset being viewed on the first device, such as "Star Wars". Depending on the configuration of control circuitry 404, the alert displayed on the second device 100 may include an option to record the media asset, such as options 126 and 166. Control circuitry 404 may, alternatively or additionally, include in the alert an option to pause the media asset, such as option 146 and 168. The alert may also include an option such as options 124, 144, and 164, to dismiss the alert without taking any action. The command transmitted by control circuitry 404 may include an indication of which option or options to include in the alert. For example, the command may be "ALERT [media_name] [options]" where [options] is an indicator of the option or options to be included in the alert.

It is contemplated that the actions or descriptions of FIG. 6 may be used with any other embodiment of this disclosure. In addition, the actions and descriptions described in relation to FIG. 6 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 6.

Figure 7:
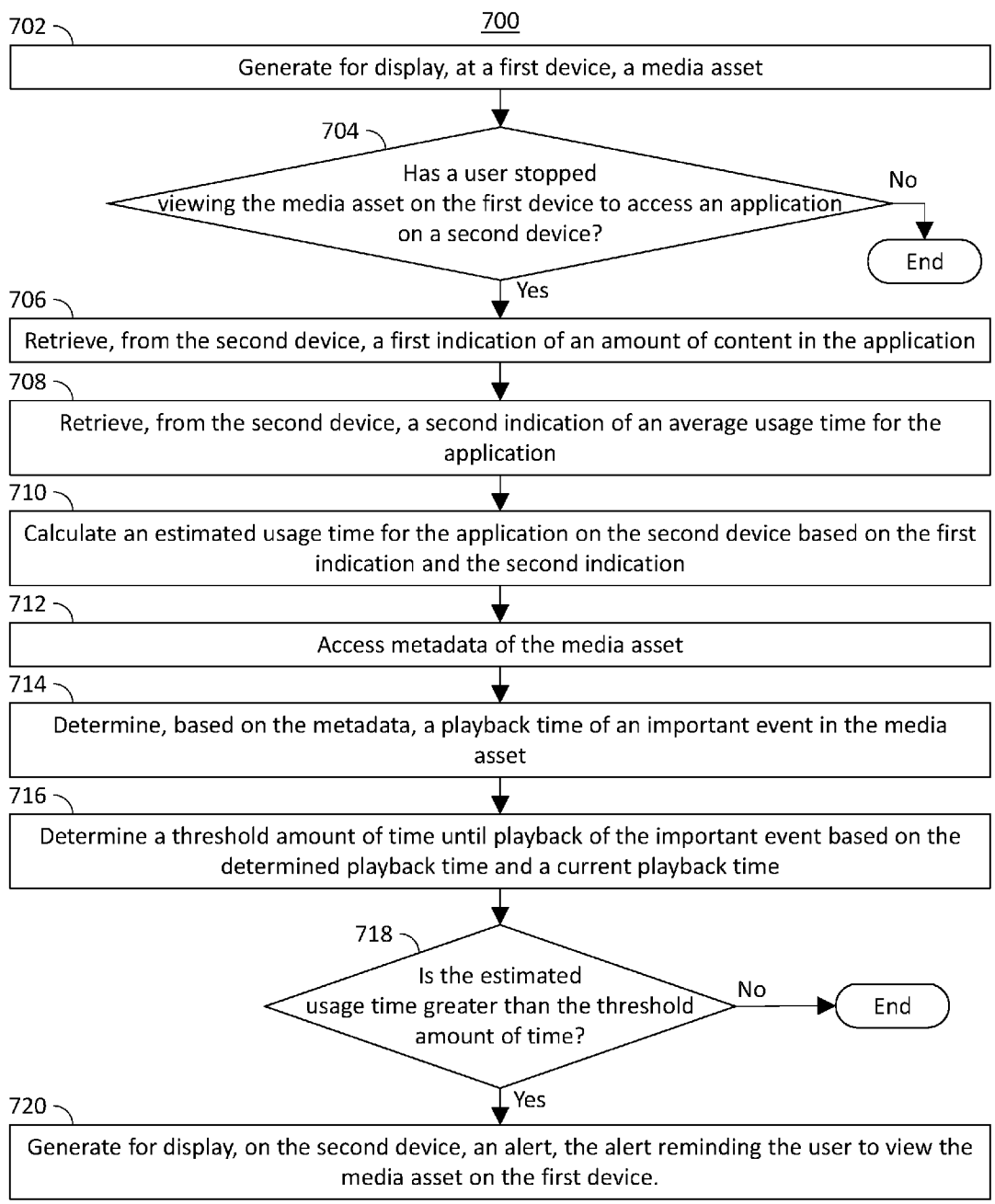
FIG. 7 is a flowchart representing a process for alerting a user to an important event in a media asset according to an embodiment of the disclosure.

FIG. 7 is a flowchart representing an illustrative process for alerting a user to an important event in a media asset in accordance with some embodiments of the disclosure. The flowchart in FIG. 7 represents a process 700 implemented on control circuitry 404 for alerting a user to an important event in a media asset according to an embodiment of the disclosure. It should be noted that process 600 or any action thereof could be performed on, or provided by, any of the devices shown in FIGS. 4-5. For example, process 700 may be executed by control circuitry 404 (FIG. 4) as instructed by a media guidance application implemented on a user device (e.g., user equipment devices 502, 504, and/or 506 (FIG. 5)) in order to alert a user to an important event in a media asset. In addition, one or more actions of process 700 may be incorporated into or combined with one or more actions of any other process or embodiment described herein.

At 702, control circuitry 404 may be configured to generate for display a media asset. For example, control circuitry 404 may receive, via I/O path 402, a media asset. Control circuitry 404 may process the media asset and generate video and audio signals for output via display 412 and speakers 414, respectively.

At 704, control circuitry 404 may be configured to determine if a user has stopped viewing the media asset to access an application on a second device 100. As described above, control circuitry 404 may communicate with the second device 100 through a wired connection, such as Ethernet, or wireless connection, such as IEEE 802.11a/b/g/n ("WiFi"), Bluetooth, Near Field Communication ("NFC"), radio, or any other suitable wireless communication protocol. Control circuitry 404 may receive data from the second device 100 indicating user input, an active application, or any other suitable metric related to use of the second device 100. For example, the second device 100 may maintain a variable, flag, or other data structure indicating a state of a user input device of the second device 100. If the second device 100 is currently receiving input from the user input device, the variable, flag, or data structure may be set to indicate that the user input device is active. Control circuitry 404 may request or access the variable, flag, or data structure to retrieve the current state of the input device. The second device 100 may also maintain a variable, flag, or data structure indicating a state of an output device of the second device 100. For example, if the second device 100 is currently outputting video or audio content, the variable, flag, or other data structure may be set to indicate that an output device is active. Control circuitry 404 may request or access the variable, flag, or data structure to retrieve the current state of the output device.

At 706, control circuitry 404 may be configured to retrieve, from the second device 100, an indication of an amount of content in the application. For example, the second device 100 may maintain a log file, database, or other data structure in which the second device 100 records information related to content received by the second device 100 that has not yet been viewed or accessed by the user of the second device 100. For example, the second device 100 may receive ten new content items from a server related to a Facebook® application, and record in the log file, database, or other data structure an indication that ten content items were received for presentation through the Facebook® application. Control circuitry 404 may, through the connection with the second device 100, request or access, from the second device 100, the log file, database or data structure of content available in the active application with which the user is interacting. For example, if the user is interacting with a Facebook® application, control circuitry 404 may request from the second device 100 an indication of an amount of new content in the Facebook® application. Once the content items have been accessed, the second device 100 may update the log file, database, or data structure to remove reference to the content items, or to mark such content items as already having been viewed or accessed.

At 708, control circuitry 404 may be configured to retrieve, from the second device 100, an indication of an average usage time for the application. For example, the second device 100 may maintain a log file, database, or other data structure listing applications available on the second device 100, along with the amount of time the user interacts with each application. For example, the second device 100 may record, in the log file, database, or data structure, each time an application is launched, an indication of the application, and the time at which the application was launched. When the user closes, exits, or otherwise leaves the application, the second device 100 may record the time at which the user closed, exited, or left the application. The second device 100 may then calculate and record a total usage time. For example, the log file, database, or data structure may indicate that the last three times the user accessed the Facebook® application, the user interacted with the application for two minutes, three minutes, and one and a half minutes, respectively. Alternatively, control circuitry 404 may calculate the total usage time upon requesting information related to the application from the log file, database, or data structure. Control circuitry 404 may further calculate an average time that user interacts with the application. Control circuitry 404 may calculate an average usage time for the Facebook® application of two minutes and ten seconds.

At 710, control circuitry 404 may be configured to calculate an estimated usage time for the application on the second device 100 based on the indication of the amount of content in the application, and the indication of the average usage time for the application. For example, the log file, database, or data structure in which the second device 100 records usage time information may be the same log file, database or data structure in which the second device 100 records the amount of content received for each application. Alternatively, the log file, database, or data structure in which the second device 100 records usage information may contain references to entries in the log file, database, or data structure in which the second device 100 records content received for each application. Control circuitry 404 may then divide the usage time for a particular application by the number of content items viewed or accessed during the particular use of the application to calculate an average usage time for each content item. Control circuitry 404 may then multiply the average usage time for each content item by the number of new content items to be viewed or accessed.

At 712, control circuitry 404 may be configured to access metadata of the media asset. Control circuitry 404 may access metadata stored locally in, for example, storage 408. Alternatively, control circuitry 404 may access metadata stored on a remote server, such as media guidance data source 518, via communications network 514.

At 714, control circuitry 404 may be configured to determine, based on the metadata, a playback time of an important event in the media asset. For example, the metadata may include data fields comprising an index of important events and corresponding playback times. As another example, the metadata may include data fields indicating the importance of the event represented in the current scene, or in the next scene. Control circuitry 404 may search the metadata, based on the current playback time, for the next scene having an indicated importance level that is above a threshold importance level.

At 716, control circuitry 404 may be configured to determine a threshold amount of time until playback of the important event based on the determined playback time and a current playback time. For example, the metadata may include a timestamp of the important event, or may include a relative amount of time from the current playback time to the important event. Control circuitry 404 may calculate the amount of time between the current playback time and the playback time of the important event. Alternatively, control circuitry 404 may convert the current system time to an integer representing the current system time in Universal Time Code ("UTC") format. Control circuitry 404 may also convert a broadcast time of the next important event to a UTC integer value. Control circuitry 404 may then subtract the integer representing the current time from the integer representing the broadcast time of the next important event to determine the threshold amount of time. Control circuitry 404 may store the threshold amount of time in a variable or other data structure in, for example, storage 408.

At 718, control circuitry 404 may be configured to compare the threshold amount of time with the estimated usage time. For example, the user may be using a social media application, and the media guidance application may estimate the usage time as five minutes. Control circuitry 404 may also determine that the threshold amount of time until the next important scene is three minutes. Control circuitry 404 may therefore determine that the estimated usage time is greater than the threshold amount of time.

At 720, in response to determining that the estimated usage time is greater than the threshold amount of time, control circuitry 404 may be configured to generate for display an alert 102, 122, 142, 162 on the second device 100, reminding the user to view the media asset on the first device. For example, control circuitry 404 may instruct the second device 100 to display a pop-up message reminding the user to watch "Star Wars" on the first device because an important scene is coming soon. For example, control circuitry 404 may transmit a command to the second device 100 such as "ALERT [media_name]" where [media_name] is the title of the media asset being viewed on the first device, such as "Star Wars". Depending on the configuration of control circuitry 404, the alert displayed on the second device 100 may include an option to record the media asset, such as options 126 and 166. Control circuitry 404 may, alternatively or additionally, include in the alert an option to pause the media asset, such as option 146 and 168. The alert may also include an option such as options 124, 144, and 164, to dismiss the alert without taking any action. The command transmitted by control circuitry 404 may include an indication of which option or options to include in the alert. For example, the command may be "ALERT [media_name] [options]" where [options] is an indicator of the option or options to be included in the alert.

It is contemplated that the actions or descriptions of FIG. 7 may be used with any other embodiment of this disclosure. In addition, the actions and descriptions described in relation to FIG. 7 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 7.

Figure 8:
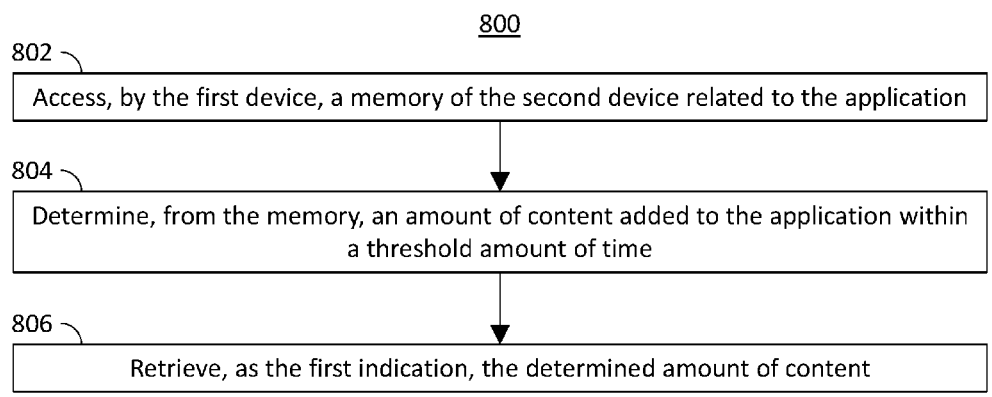
FIG. 8 is a flowchart representing a process for retrieving an indication of an amount of content in an application according to an embodiment of the disclosure.

FIG. 8 is a flowchart representing an illustrative process for retrieving an indication of an amount of content in an application in accordance with some embodiments of the disclosure. The flowchart in FIG. 8 represents a process 800 implemented on control circuitry 404 for retrieving an indication of an amount of content in an application according to an embodiment of the disclosure. It should be noted that process 800 or any action thereof could be performed on, or provided by, any of the devices shown in FIGS. 4-5. For example, process 800 may be executed by control circuitry 404 (FIG. 4) as instructed by a media guidance application implemented on a user device (e.g., user equipment devices 502, 504, and/or 506 (FIG. 5)) in order to retrieve an indication of an amount of content in an application. In addition, one or more actions of process 800 may be incorporated into or combined with one or more actions of any other process or embodiment described herein.

At 802, control circuitry 404 may be configured to access a memory of the second device 100 related to the application. For example, control circuitry 404 may access a memory of the second device 100 related to the Facebook® application.

At 804, control circuitry 404 may be configured to determine, from the memory of the second device 100, an amount of content added to the application within a threshold amount of time. For example, control circuitry 404 may extract an indication from the memory of the second device 100 of the amount of new content available in the application. For example, control circuitry 404 may access a log file, database, or other data structure in which the second device 100 records content received for each application. Control circuitry 404 may search the log file, database, or data structure for content related to the application with which the user is interacting. Control circuitry 404 may determine an amount of content added to the application within a threshold amount of time. For example, control circuitry 404 may analyze entries in the log file, database, or data structure of the second device 100 related to the Facebook® application and determine that an amount of content has been added to the application in the last thirty minutes.

At 806, control circuitry 404 may retrieve, as the indication of the amount of content in the application, the amount of content added in the threshold amount of time.

It is contemplated that the actions or descriptions of FIG. 8 may be used with any other embodiment of this disclosure. In addition, the actions and descriptions described in relation to FIG. 8 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 8.

Figure 9:
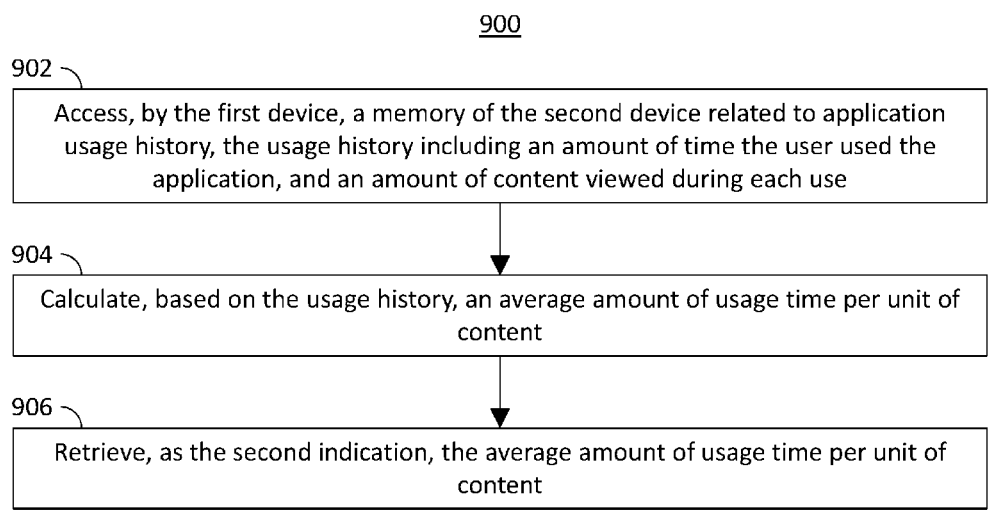
FIG. 9 is a flowchart representing a process for retrieving an indication of an average usage time of an application according to an embodiment of the disclosure.

FIG. 9 is a flowchart representing an illustrative process for retrieving an indication of an average usage time of an application in accordance with some embodiments of the disclosure. The flowchart in FIG. 9 represents a process 900 implemented on control circuitry 404 for retrieving an indication of an average usage time of an application according to an embodiment of the disclosure. It should be noted that process 900 or any action thereof could be performed on, or provided by, any of the devices shown in FIGS. 4-5. For example, process 900 may be executed by control circuitry 404 (FIG. 4) as instructed by a media guidance application implemented on a user device (e.g., user equipment devices 502, 504, and/or 506 (FIG. 5)) in order to retrieve an indication of an average usage time of an application. In addition, one or more actions of process 900 may be incorporated into or combined with one or more actions of any other process or embodiment described herein.

At 902, control circuitry 404 may be configured to access a memory of the second device 100 related to application usage history. The application usage history may include an amount of time the user used the application, and an amount of content viewed during each such use. For example, the application usage log of the second device 100, described above, may record an amount of content consumed in each application each time the user interacted with each respective application. Control circuitry 404 may access, request, or retrieve the application usage log of the second device.

At 904, control circuitry 404 may be configured to calculate an estimated usage time per unit of content. For example, using the amount of content consumed in the application, and the amount of time the user used the application, as recorded in the application usage log, control circuitry 404 may divide the amount of time the user used the application by the number of content items consumed during that usage. Control circuitry 404 may repeat this calculation for several usages of the application, and compute an average across the several usages to determine an average amount of usage time per unit of content.

At 906, control circuitry 404 may be configured to retrieve, as the indication of the average usage time per unit of content, the above-calculated average amount of time per unit of content.

It is contemplated that the actions or descriptions of FIG. 9 may be used with any other embodiment of this disclosure. In addition, the actions and descriptions described in relation to FIG. 9 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 9.

Figure 10:
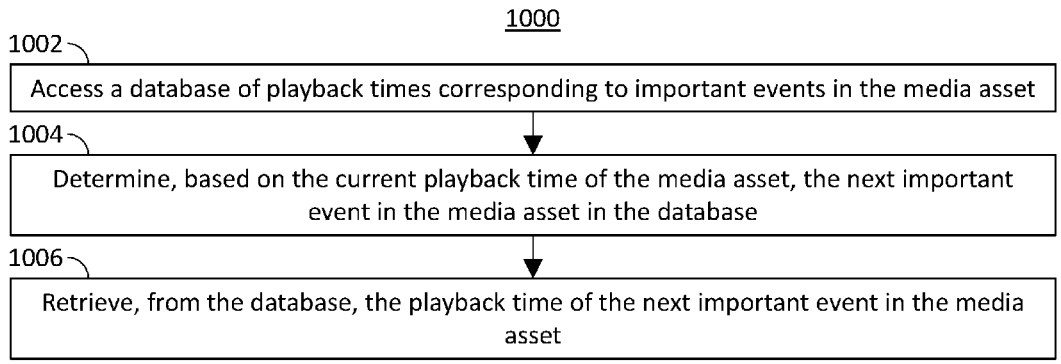
FIG. 10 is a flowchart representing a process for determining a playback time of an important event in a media asset according to an embodiment of the disclosure.

FIG. 10 is a flowchart representing an illustrative process for determining a playback time of an important event in a media asset in accordance with some embodiments of the disclosure. The flowchart in FIG. 10 represents a process 1000 implemented on control circuitry 404 for determining a playback time of an important event in a media asset according to an embodiment of the disclosure. It should be noted that process 1000 or any action thereof could be performed on, or provided by, any of the devices shown in FIGS. 4-5. For example, process 1000 may be executed by control circuitry 404 (FIG. 4) as instructed by a media guidance application implemented on a user device (e.g., user equipment devices 502, 504, and/or 506 (FIG. 5)) in order to determine a playback time of an important event in a media asset. In addition, one or more actions of process 1000 may be incorporated into or combined with one or more actions of any other process or embodiment described herein.

At 1002, control circuitry 404 may be configured to access a database of playback times corresponding to important events in the media asset. The database may be stored locally, such as in storage 408, or may be stored on a remote server, such as media guidance data source 518. The playback times may be relative to the start of the media asset, or may be actual times based on the time at which playback of the media asset began. For example, a database for "Star Wars" may indicate important events at ten minutes, twenty-five minutes, fifty-three minutes, and eighty-four minutes from the start of the movie.

At 1004, control circuitry 404 may be configured to determine, based on the current playback time, the next important event in the media asset in the database. For example, if the current playback time for "Star Wars" is forty-seven minutes, the media guidance application may determine that the next important event occurs at fifty-three minutes, and retrieve fifty-three minutes as the playback time of the next important event. As another example, the database for a broadcast of "Star Wars" which began at 7:00 PM may indicate important events at 7:10 PM, 7:25 PM, 7:53 PM, and 8:24 PM. If the current time is 7:47 PM, the media guidance application may determine that the next important event occurs at 7:53 PM. The media guidance application may compare the current time with the times indicated in the database by first converting both times to a UTC integer value, or may compare the hour and minute values of the current time with those of the event times indicated in the database.

At 1006, control circuitry 404 may be configured to retrieve, from the database, the above-determined playback time of the next important event in the media asset.

It is contemplated that the actions or descriptions of FIG. 10 may be used with any other embodiment of this disclosure. In addition, the actions and descriptions described in relation to FIG. 10 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 10.

Figure 11:
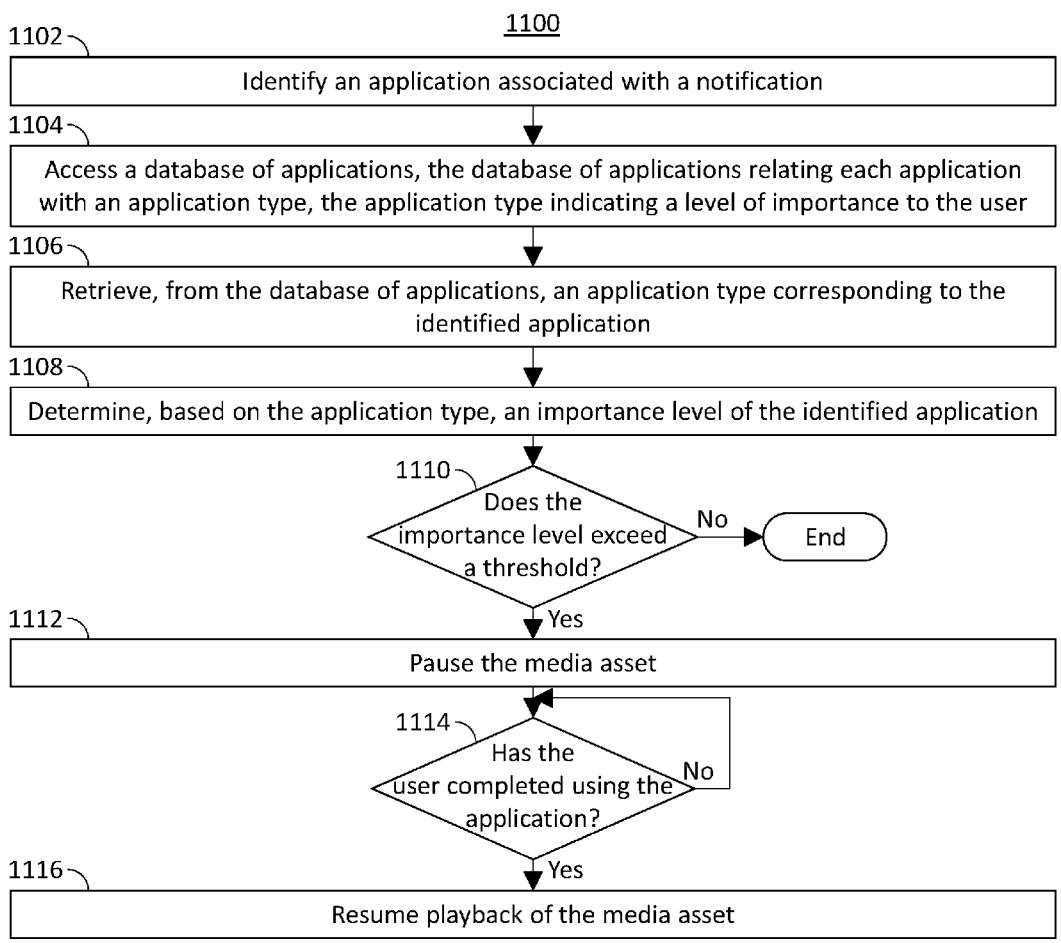
FIG. 11 is a flowchart representing a process for pausing a media asset based on an importance of an application being used by a user according to an embodiment of the disclosure.

FIG. 11 is a flowchart representing an illustrative process for pausing a media asset based on an importance of an application being used by a user in accordance with some embodiments of the disclosure. The flowchart in FIG. 11 represents a process 1100 implemented on control circuitry 404 for pausing a media asset based on an importance of an application being used by a user according to an embodiment of the disclosure. It should be noted that process 1100 or any action thereof could be performed on, or provided by, any of the devices shown in FIGS. 4-5. For example, process 1100 may be executed by control circuitry 404 (FIG. 4) as instructed by a media guidance application implemented on a user device (e.g., user equipment devices 502, 504, and/or 506 (FIG. 5)) in order to pause a media asset based on an importance of an application being used by a user. In addition, one or more actions of process 1100 may be incorporated into or combined with one or more actions of any other process or embodiment described herein.

In some embodiments, the user may stop viewing the media asset on the first device in response to a notification on the second device 100. At 1102, control circuitry 404 may be configured to identify an application associated with a notification. For example, control circuitry 404 may access a log file, database, or data structure of the second device 100 related to notifications, and determine which application generated the most recent notification. Alternatively, control circuitry 404 may determine, from the currently active application on the second device 100, the method through which the application was launched. For example, an application may be launched from a second application, by selection of the application, or by selection of a notification related to the application.

At 1104, control circuitry 404 may be configured to access a database of applications, the database of applications relating each application with an application type, the application type indicating a level of importance to the user. For example, control circuitry 404 may access a database of applications that relates each application with an application type indicating a level of importance to the user. For example, an application with a type "GAME" may have low importance to the user, while an application with a type "SOCIAL" or "MESSAGING" may have high importance to the user. The importance to the user may be based on usage history of each application. For example, the second device 100 may record, as part of the usage history, an average amount of time between a notification from an application and the user's interaction with that application in response to the notification. Additionally, the second device 100 may record the type of interaction, such as a dismissal of the notification, usage of the application for only a short period of time, such as ten seconds, or usage of the application for a long period of time, such as one minute. Based on the above metrics, the second device 100 or control circuitry 404 may calculate a level of importance the user places on each application.

At 1106, control circuitry 404 may be configured to retrieve, from the database of applications, an application type corresponding to the identified application. For example, control circuitry 404 may request, query, extract, or otherwise capture data from the database related to the identified application. For example, control circuitry 404 may use an SQL SELECT command to retrieve a database entry related to the identified application. The database entry may include a data field indicating an application type of the identified application.

At 1108, control circuitry 404 may be configured to determine, based on the application type, an importance level of the identified application. Based on the metrics described above, control circuitry 404 may determine that the identified application level has a particular importance level.

At 1110, control circuitry 404 may be configured to determine if the importance level of the identified application exceeds a threshold importance level. For example, control circuitry 404 may store, in storage 408, a variable or other data structure indicating a threshold importance level. Control circuitry 404 may compare the importance level of the identified application with the stored threshold importance level.

At 1112, in response to determining that the importance level of the identified application exceeds the threshold importance level, control circuitry 404 may be configured to pause the media asset. For example, if the application has a type indicating high importance to the user, control circuitry 404 may pause the media asset automatically.

At 1114, control circuitry 404 may be configured to determine if the user has completed using the application. For example, control circuitry 404 may detect when the user has closed the application, or has otherwise stopped interacting with the application.

At 1116, in response to determining that the user has completed using the application, control circuitry 404 may be configured to resume playing the media asset.

It is contemplated that the actions or descriptions of FIG. 11 may be used with any other embodiment of this disclosure. In addition, the actions and descriptions described in relation to FIG. 11 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 11.

Figure 12:
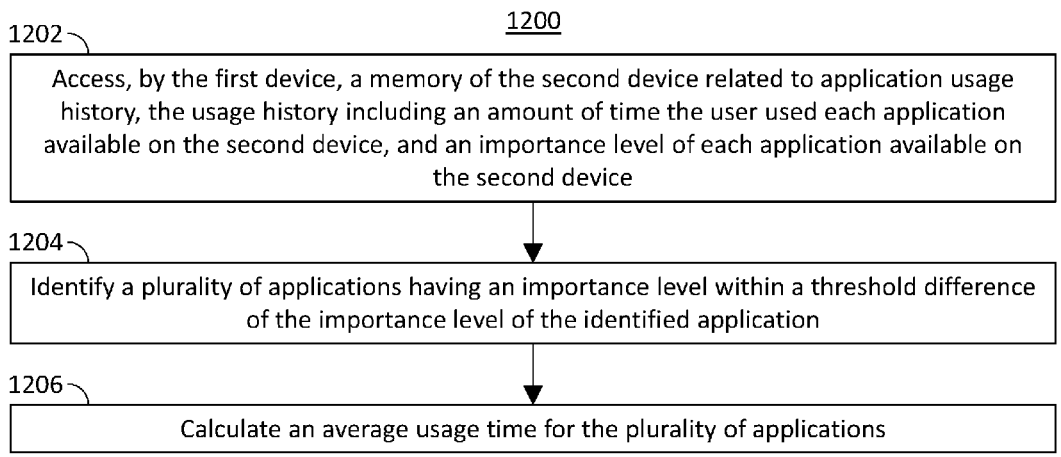
FIG. 12 is a flowchart representing a process for calculating an estimated usage time of an application according to an embodiment of the disclosure.

FIG. 12 is a flowchart representing an illustrative process for calculating an estimated usage time of an application in accordance with some embodiments of the disclosure. The flowchart in FIG. 12 represents a process 1200 implemented on control circuitry 404 for calculating an estimated usage time of an application according to an embodiment of the disclosure. It should be noted that process 1200 or any action thereof could be performed on, or provided by, any of the devices shown in FIGS. 4-5. For example, process 1200 may be executed by control circuitry 404 (FIG. 4) as instructed by a media guidance application implemented on a user device (e.g., user equipment devices 502, 504, and/or 506 (FIG. 5)) in order to calculate an estimated usage time of an application. In addition, one or more actions of process 1200 may be incorporated into or combined with one or more actions of any other process or embodiment described herein.

At 1202, control circuitry 404 may be configured to access a memory of the second device 100 related to application usage history, the usage history including an amount of time the user used each application available on the second device 100, and an importance level of each application available on the second device 100. For example, control circuitry 404 may access a log file, database, or data structure of the second device 100 related to application usage history and identify a plurality of applications having an importance level within a threshold difference of the importance level of the identified application.

At 1204, control circuitry 404 may be configured to identify a plurality of applications having an importance level within a threshold difference of the importance level of the identified application. For example, the identified application may have an importance level of "MEDIUM-HIGH". Control circuitry 404 may identify a plurality of applications having an importance level that is within one degree of importance lower and one degree of importance higher than "MEDIUM-HIGH". In other words, control circuitry 404 may identify a plurality of applications having an importance level of either "MEDIUM", "MEDIUM-HIGH", or "HIGH".

At 1206, control circuitry 404 may be configured to calculate an average usage time for the plurality of applications. For example, if the identified application has an importance level of "MEDIUM-HIGH" and there are three other applications having an importance level of "MEDIUM", "MEDIUM-HIGH", or "HIGH" on the second device 100, control circuitry 404 may calculate an average usage time for the identified application that is an average taken of the average usage times of the three other applications of the same or similar importance level.

It is contemplated that the actions or descriptions of FIG. 12 may be used with any other embodiment of this disclosure. In addition, the actions and descriptions described in relation to FIG. 12 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 12.

Figure 13:
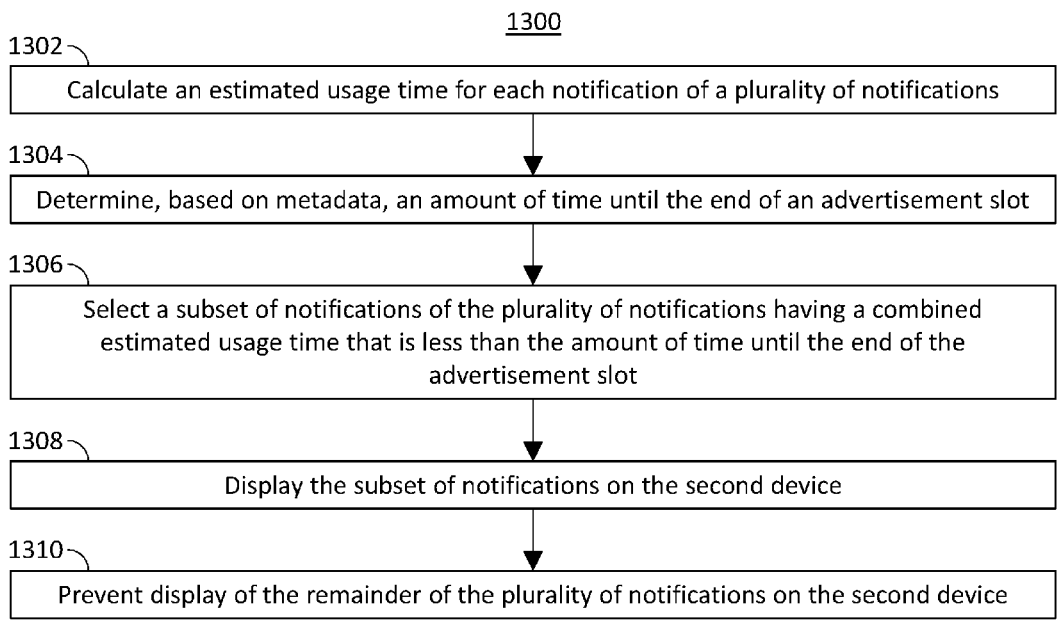
FIG. 13 is a flowchart representing a process for displaying a subset of notifications on a second device according to an embodiment of the disclosure.

FIG. 13 is a flowchart representing an illustrative process for displaying a subset of notifications on a second device in accordance with some embodiments of the disclosure. The flowchart in FIG. 13 represents a process 1300 implemented on control circuitry 404 for displaying a subset of notifications on a second device according to an embodiment of the disclosure. It should be noted that process 1300 or any action thereof could be performed on, or provided by, any of the devices shown in FIGS. 4-5. For example, process 1300 may be executed by control circuitry 404 (FIG. 4) as instructed by a media guidance application implemented on a user device (e.g., user equipment devices 502, 504, and/or 506 (FIG. 5)) in order to display a subset of notifications on a second device. In addition, one or more actions of process 1300 may be incorporated into or combined with one or more actions of any other process or embodiment described herein.

At 1302, control circuitry 404 may be configured to calculate an estimated usage time for the application associated with each notification of a plurality of notifications. Using methods described above, control circuitry 404 may calculate an average usage time for each application related to a notification of the plurality of notifications. For example, for three notifications, the media guidance application may calculate an average usage time for each respective application of one minute, thirty seconds, and two minutes.

At 1304, control circuitry 404 may be configured to determine, based on metadata of the media asset, an amount of time until the end of the advertisement slot. For example, metadata of the media asset may indicate that the advertisement slot is two minutes in length.

At 1306, control circuitry 404 may be configured to select a subset of notifications to present to the user on the second device having a combined average usage time that is less than the amount of time between the current playback time and the end of the advertisement slot. The notifications selected to be presented may be further based on the importance level of each related application. For example, if the application with an average usage time of two minutes is of the highest importance level, the media guidance application may present only the notification for that application.

At 1308, control circuitry 404 may be configured to display the subset of notifications on the second device 100, while at 1310, control circuitry 404 may be configured to prevent display of the remainder of the plurality of notifications on the second device 100.

It is contemplated that the actions or descriptions of FIG. 13 may be used with any other embodiment of this disclosure. In addition, the actions and descriptions described in relation to FIG. 13 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 13.

Figure 14:
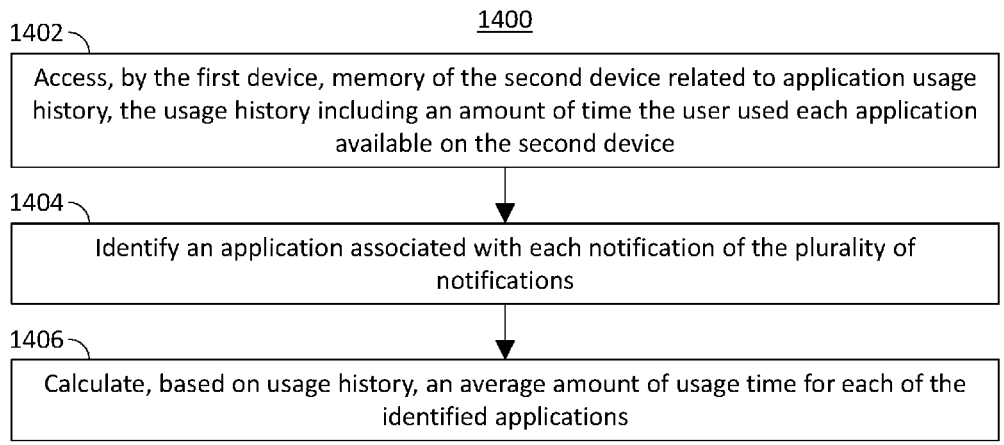
FIG. 14 is a flowchart representing a process for calculating an estimated usage time of an application according to an embodiment of the disclosure.

FIG. 14 is a flowchart representing an illustrative process for calculating an estimated usage time of an application in accordance with some embodiments of the disclosure. The flowchart in FIG. 14 represents a process 1400 implemented on control circuitry 404 for calculating an estimated usage time of an application according to an embodiment of the disclosure. It should be noted that process 1400 or any action thereof could be performed on, or provided by, any of the devices shown in FIGS. 4-5. For example, process 1400 may be executed by control circuitry 404 (FIG. 4) as instructed by a media guidance application implemented on a user device (e.g., user equipment devices 502, 504, and/or 506 (FIG. 5)) in order to calculate an estimated usage time of an application. In addition, one or more actions of process 1400 may be incorporated into or combined with one or more actions of any other process or embodiment described herein.

At 1402, control circuitry 404 may be configured to access memory of the second device related to application usage history, the usage history including an amount of time the user used each application available on the second device 100. Methods for accomplishing this are described above with reference to FIG. 12.

At 1404, control circuitry 404 may be configured to identify an application associated with each notification of the plurality of notifications. Methods for accomplishing this are described above with reference to FIG. 11.

At 1406, control circuitry 404 may be configured to calculate, based on usage history, an average amount of usage time for each of the identified applications. Methods for accomplishing this are described above with reference to FIG. 9.

It is contemplated that the actions or descriptions of FIG. 14 may be used with any other embodiment of this disclosure. In addition, the actions and descriptions described in relation to FIG. 14 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 14.

Figure 15:
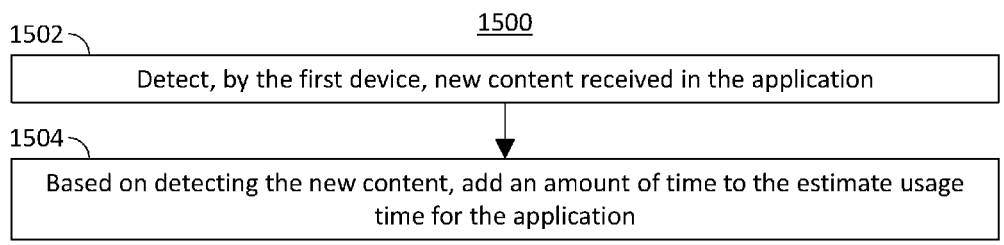
FIG. 15 is a flowchart representing a process for updating an estimated usage time of an application according to an embodiment of the disclosure.

FIG. 15 is a flowchart representing an illustrative process for updating an estimated usage time of an application in accordance with some embodiments of the disclosure. The flowchart in FIG. 15 represents a process 1500 implemented on control circuitry 404 for updating an estimated usage time of an application according to an embodiment of the disclosure. It should be noted that process 1500 or any action thereof could be performed on, or provided by, any of the devices shown in FIGS. 4-5. For example, process 1500 may be executed by control circuitry 404 (FIG. 4) as instructed by a media guidance application implemented on a user device (e.g., user equipment devices 502, 504, and/or 506 (FIG. 5)) in order to update an estimated usage time of an application. In addition, one or more actions of process 1500 may be incorporated into or combined with one or more actions of any other process or embodiment described herein.

At 1502, to update the estimated usage time, control circuitry 404 may be configured to detect new content received in the application. For example, new content may be received while the user is interacting with the application. For example, the user may be interacting with a Facebook® application and new content items may become available while the user is viewing other content in the application. Control circuitry 404 may connect to a memory or a programming interface related to the application through which control circuitry 404 may detect receipt of new content items.

At 1504, control circuitry 404 may be configured to add an amount of time to the estimated usage time based on the amount of detected new content. For example, using methods described above, control circuitry 404 may estimate a usage time for the new content and add the estimated usage time for the new content to the previously estimated usage time.

It is contemplated that the actions or descriptions of FIG. 15 may be used with any other embodiment of this disclosure. In addition, the actions and descriptions described in relation to FIG. 15 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 15.

Figure 16:
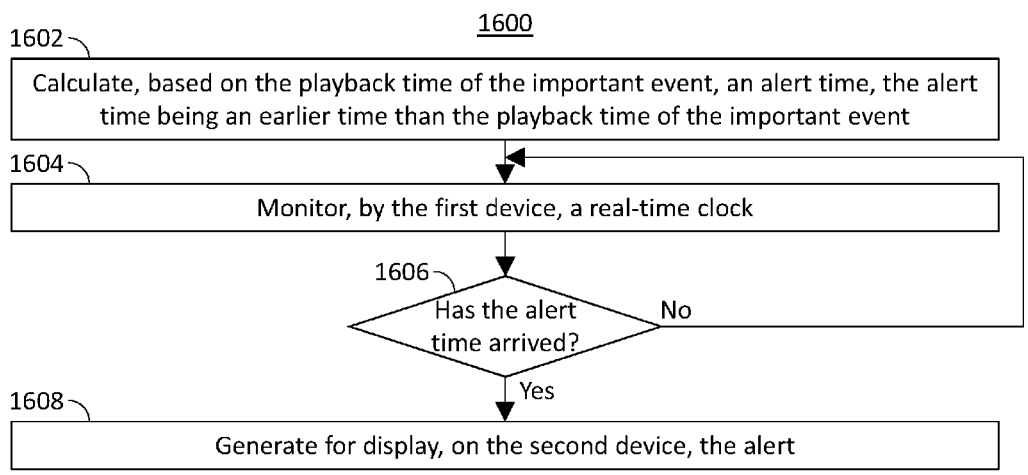
FIG. 16 is a flowchart representing a process for generating for display an alert according to an embodiment of the disclosure.

FIG. 16 is a flowchart representing an illustrative process for generating for display an alert in accordance with some embodiments of the disclosure. The flowchart in FIG. 16 represents a process 1600 implemented on control circuitry 404 for generating for display an alert according to an embodiment of the disclosure. It should be noted that process 1600 or any action thereof could be performed on, or provided by, any of the devices shown in FIGS. 4-5. For example, process 1600 may be executed by control circuitry 404 (FIG. 4) as instructed by a media guidance application implemented on a user device (e.g., user equipment devices 502, 504, and/or 506 (FIG. 5)) in order to generate for display an alert. In addition, one or more actions of process 1600 may be incorporated into or combined with one or more actions of any other process or embodiment described herein.

At 1602, control circuitry may be configured to calculate, based on the playback time of an important event, an alert time, the alert time being an earlier time than the playback time of the important event. For example, playback time of the important event may occur in five minutes. Control circuitry 404 may have a threshold alert time of two minutes prior to an important event, and may calculate the alert time to occur in three minutes.

At 1604, control circuitry 404 may be configured to monitor a real-time clock. For example, control circuitry 404 may compare the time from a real-time clock with the calculated alert time.

At 1606, control circuitry 404 may be configured to determine if the alert time has arrived. For example, control circuitry 404 may convert the time from the real-time clock and the alert time to UTC integer values. Control circuitry 404 may use mathematical comparators to determine if the current time of the real-time clock matches the alert time. At 1608, in response to determining that the alert time has arrived, control circuitry 404 may be configured to generate for display, on the second device 100, the alert 102, 122, 142, 162.

It is contemplated that the actions or descriptions of FIG. 16 may be used with any other embodiment of this disclosure. In addition, the actions and descriptions described in relation to FIG. 16 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 16.

Figure 17:
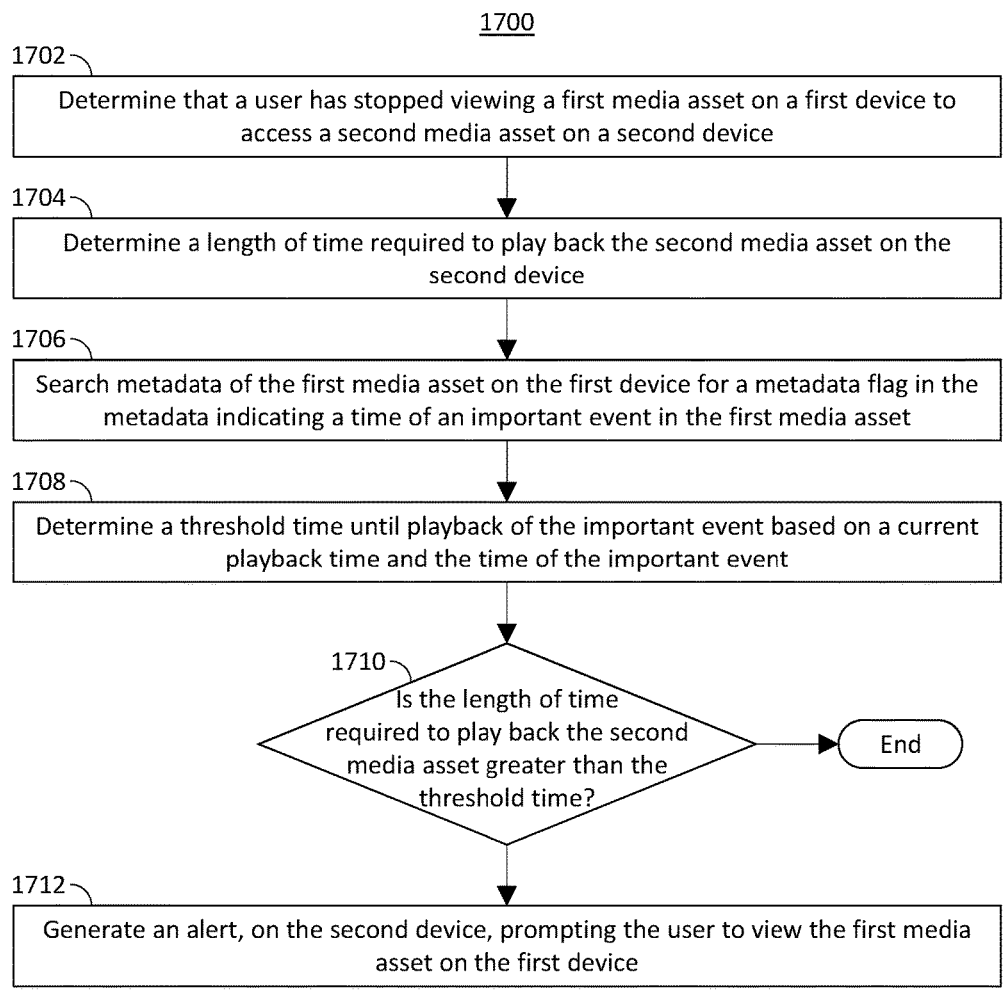
FIG. 17 is a flowchart representing a process for alerting a user to an important event in a first media asset while the user is viewing a second media asset according to an embodiment of the disclosure.

FIG. 17 is a flowchart representing an illustrative process for alerting a user to an important event in a first media asset while the user is viewing a second media asset in accordance with some embodiments of the disclosure. The flowchart in FIG. 17 represents a process 1700 implemented on control circuitry 404 for alerting a user to an important event in a first media asset while the user is viewing a second media asset according to an embodiment of the disclosure. It should be noted that process 1700 or any action thereof could be performed on, or provided by, any of the devices shown in FIGS. 4-5. For example, process 1700 may be executed by control circuitry 404 (FIG. 4) as instructed by a media guidance application implemented on a user device (e.g., user equipment devices 502, 504, and/or 506 (FIG. 5)) in order to alert a user to an important event in a first media asset while the user is viewing a second media asset. In addition, one or more actions of process 1700 may be incorporated into or combined with one or more actions of any other process or embodiment described herein.

At 1702, control circuitry 404 may be configured to determine that a user has stopped viewing a first media asset on a first device to access a second media asset on the second device 100. For example, the user may be watching "Star Wars" on a first device, and begin watching another media asset on YouTube® on a second device 100. Control circuitry 404 may, through the connection with the second device 100, detect that the active application is a media asset presentation application, such as YouTube®.

At 1704, control circuitry 404 may be configured to determine a length of time required to play back the second media asset on the second device 100. For example, control circuitry 404 may access metadata of the second media asset to determine the duration of the second media asset.

At 1706, control circuitry 404 may be configured to search metadata of the first media asset for a metadata flag in the metadata indicating a time of an important event in the first media asset. For example, the metadata of "Star Wars" may include a metadata flag indicating that an important event occurs at eighty-four minutes from the start of the movie.

At 1708, control circuitry 404 may be configured to determine a threshold amount of time until playback of the important event based on a current playback time and a playback time of the important event. For example, control circuitry 404 may compare the current playback time with the playback time of the important event to determine the amount of time until the important event occurs.

At 1710, control circuitry 404 may be configured to determine if the length of time required to play back the second media asset is greater than the threshold amount of time. For example, control circuitry 404 may compare the length of time required to play back the second media asset with the threshold amount of time.

At 1712, if control circuitry 404 determines that the length of time required to play back the second media asset is greater than the threshold amount of time, control circuitry 404 may generate an alert 102, 122, 142, 162 on the second device 100 reminding the user to view the first media asset.

It is contemplated that the actions or descriptions of FIG. 17 may be used with any other embodiment of this disclosure. In addition, the actions and descriptions described in relation to FIG. 17 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 17.

Figure 18:
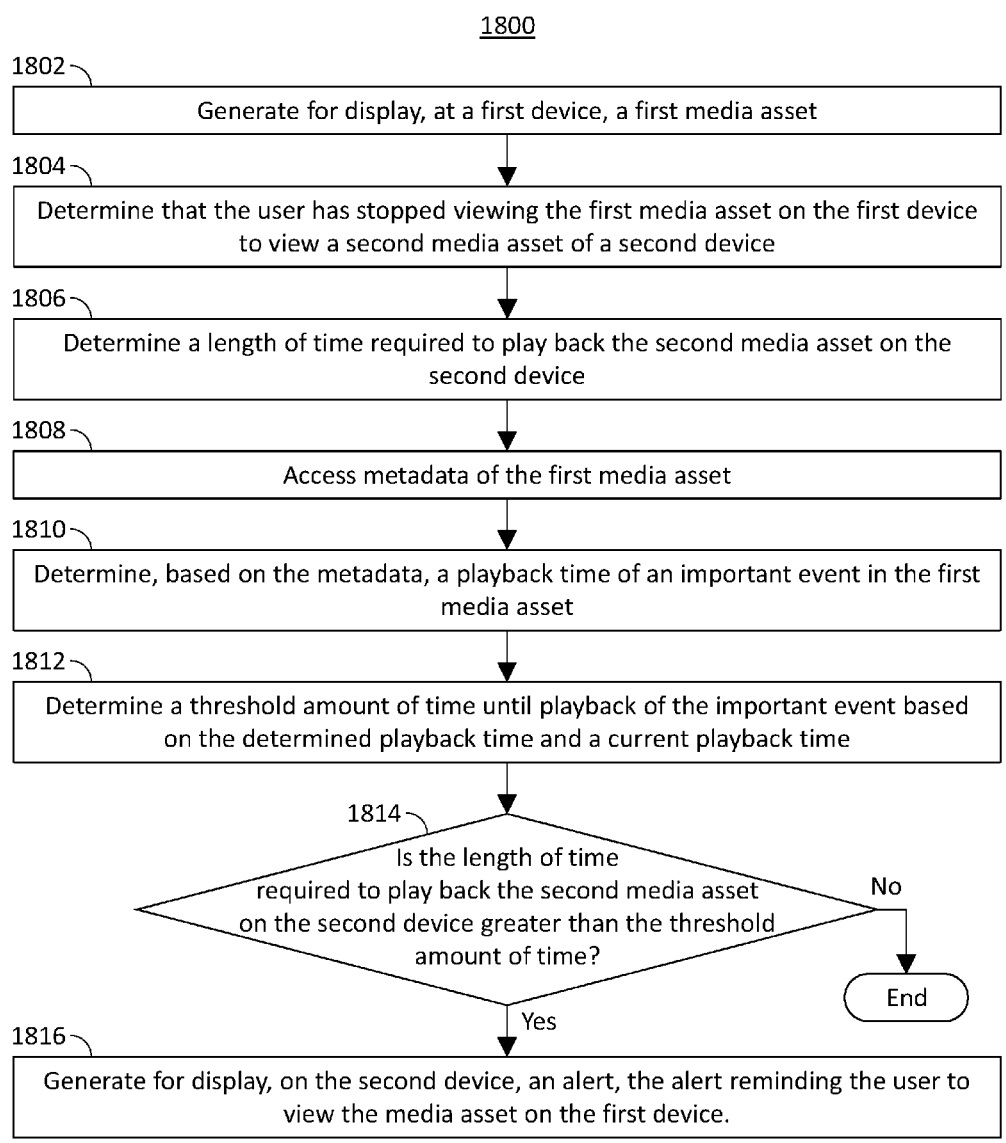
FIG. 18 is a flowchart representing a process for alerting a user to an important event in a first media asset while the user is viewing a second media asset according to an embodiment of the disclosure.

FIG. 18 is a flowchart representing an illustrative process for alerting a user to an important event in a first media asset while the user is viewing a second media asset in accordance with some embodiments of the disclosure. The flowchart in FIG. 18 represents a process 1800 implemented on control circuitry 404 for alerting a user to an important event in a first media asset while the user is viewing a second media asset according to an embodiment of the disclosure. It should be noted that process 1800 or any action thereof could be performed on, or provided by, any of the devices shown in FIGS. 4-5. For example, process 1800 may be executed by control circuitry 404 (FIG. 4) as instructed by a media guidance application implemented on a user device (e.g., user equipment devices 502, 504, and/or 506 (FIG. 5)) in order to alert a user to an important event in a first media asset while the user is viewing a second media asset. In addition, one or more actions of process 1800 may be incorporated into or combined with one or more actions of any other process or embodiment described herein.

At 1802, control circuitry 404 may be configured to generate for display a first media asset. As described above with relation to FIG. 7, control circuitry 404 may, for example, receive, via I/O path 402, a media asset. Control circuitry 404 may process the media asset and generate video and audio signals for output via display 412 and speakers 414, respectively.

At 1804, control circuitry 404 may be configured to determine that the user has stopped viewing the first media asset on the first device to view a second media asset on the second device 100. For example, as will be discussed below with reference to FIG. 19, control circuitry 404 may detect that a media asset presentation application is currently active on the second device 100.

At 1806, control circuitry 404 may be configured to determine a length of time required to play back the second media asset on the second device 100. For example, control circuitry 404 may access metadata related to the second media asset to determine the length of the second media asset.

At 1808, control circuitry 404 may be configured to access metadata of the first media asset. For example, control circuitry 404 may access storage 408 and retrieve metadata related to the first media application stored locally therein. Alternatively, control circuitry 404 may access a remote server such as media guidance data source 518, via communications network 514.

At 1810, control circuitry 404 may determine, based on the metadata of the first device, a playback time of an important event in the first media asset. For example, as described above, the metadata of the first media asset may include data related to important events in the first media asset.

At 1812, control circuitry 404 may determine a threshold amount of time until playback of the important event in the first media asset based on the determined playback time and the current playback time. Methods for accomplishing this are described above with relation to FIG. 7.

At 1814, control circuitry 404 may be configured to determine if the length of time required to play back the second media asset on the second device 100 is greater than the threshold amount of time. For example, control circuitry 404 may compare the amount of time required to play back the second media asset with the threshold amount of time.

At 1816, in response to determining that the length of time required to play back the second media asset on the second device 100 is greater than the threshold amount of time, control circuitry 404 may be configured to generate for display on the second device 100 an alert 102, 122, 142, 162, reminding the user to view the first media asset on the first device.

It is contemplated that the actions or descriptions of FIG. 18 may be used with any other embodiment of this disclosure. In addition, the actions and descriptions described in relation to FIG. 18 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 18.

Figure 19:
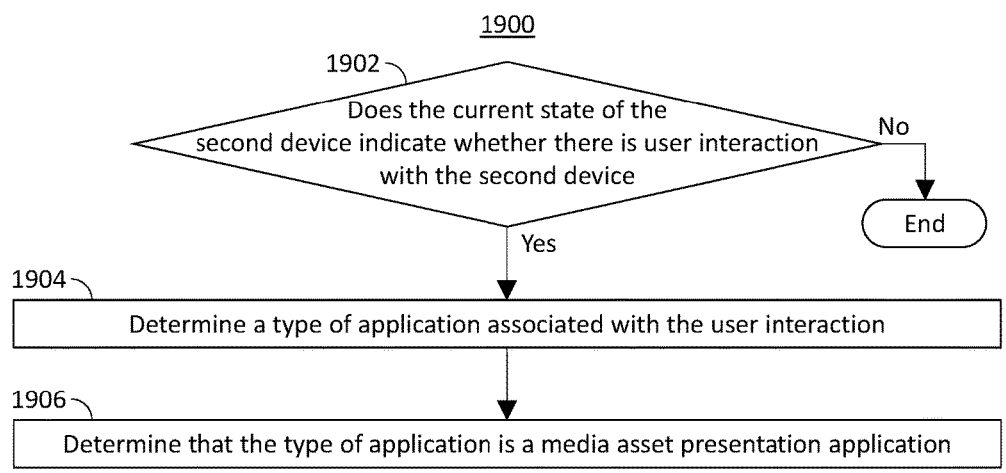
FIG. 19 is a flowchart representing a process for determining that a user has stopped viewing a first media asset on a first device to view a second media asset on a second device according to an embodiment of the disclosure.

FIG. 19 is a flowchart representing an illustrative process for determining that a user has stopped viewing a first media asset on a first device to view a second media asset on a second device in accordance with some embodiments of the disclosure. The flowchart in FIG. 19 represents a process 1900 implemented on control circuitry 404 for determining that a user has stopped viewing a first media asset on a first device to view a second media asset on a second device according to an embodiment of the disclosure. It should be noted that process 1900 or any action thereof could be performed on, or provided by, any of the devices shown in FIGS. 4-5. For example, process 1900 may be executed by control circuitry 404 (FIG. 4) as instructed by a media guidance application implemented on a user device (e.g., user equipment devices 502, 504, and/or 506 (FIG. 5)) in order to determine that a user has stopped viewing a first media asset on a first device to view a second media asset on a second device. In addition, one or more actions of process 1900 may be incorporated into or combined with one or more actions of any other process or embodiment described herein.

At 1902, control circuitry 404 may be configured to determine if the current state of the second device 100 indicates whether there is user interaction with the second device 100. For example, control circuitry 404 may determine a state of the second device 100 indicating whether there is user interaction with the second device. For example, control circuitry 404 may access a memory or sensor of the second device 100 to determine if the second device 100 is currently receiving user input.

At 1904, if control circuitry 404 determines that the user is interacting with the second device 100, control circuitry 404 may be configured to determine a type of application associated with the user interaction. For example, control circuitry 404 may access a memory of the second device 100 to determine which application is currently active, or to which application the user inputs are being directed.

At 1906, control circuitry 404 may further determine, based on the application type, that the application is a media asset presentation application, such as YouTube®. For example, the application may have a type of "MEDIA".

It is contemplated that the actions or descriptions of FIG. 19 may be used with any other embodiment of this disclosure. In addition, the actions and descriptions described in relation to FIG. 19 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 19.

Figure 20:
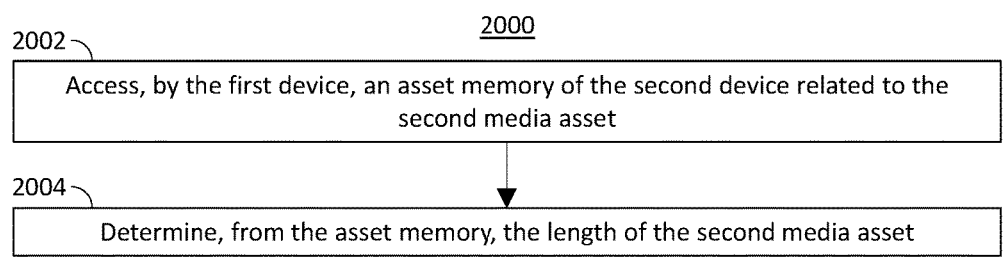
FIG. 20 is a flowchart representing a process for determining the length of time required to play back a media asset according to an embodiment of the disclosure.

FIG. 20 is a flowchart representing an illustrative process for determining the length of time required to play back a media asset in accordance with some embodiments of the disclosure. The flowchart in FIG. 20 represents a process 2000 implemented on control circuitry 404 for determining the length of time required to play back a media asset according to an embodiment of the disclosure. It should be noted that process 2000 or any action thereof could be performed on, or provided by, any of the devices shown in FIGS. 4-5. For example, process 2000 may be executed by control circuitry 404 (FIG. 4) as instructed by a media guidance application implemented on a user device (e.g., user equipment devices 502, 504, and/or 506 (FIG. 5)) in order to determine the length of time required to play back a media asset. In addition, one or more actions of process 2000 may be incorporated into or combined with one or more actions of any other process or embodiment described herein.

At 2002, control circuitry 404 may be configured to access an asset memory of the second device 100 related to the second media asset. For example, control circuitry 404 may access a memory location of the second device 100 in which media assets are temporarily stored or buffered prior to display on the second device 100. Alternatively, control circuitry 404 may access a memory location related to the application on which the second media asset is being presented.

At 2004, control circuitry 404 may be configured to determine, from the asset memory, the length of the second media asset. For example, control circuitry 404 may retrieve from the memory buffer, or from the application memory, metadata of the second media asset. The metadata of the second media asset may include the length of the second media asset.

It is contemplated that the actions or descriptions of FIG. 20 may be used with any other embodiment of this disclosure. In addition, the actions and descriptions described in relation to FIG. 20 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 20.

Figure 21:
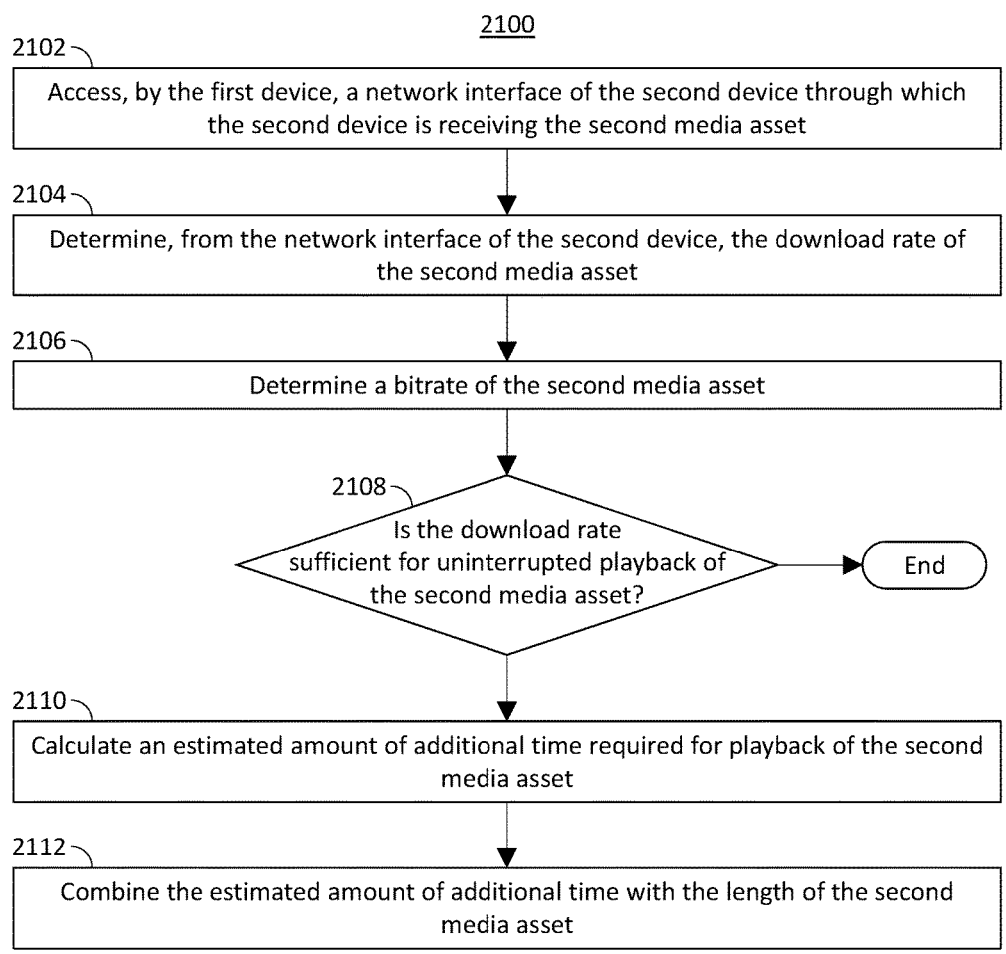
FIG. 21 is a flowchart representing a process for updating an estimated amount of time required to play back a media asset based on network conditions according to an embodiment of the disclosure.

FIG. 21 is a flowchart representing an illustrative process for updating an estimated amount of time required to play back a media asset based on network conditions in accordance with some embodiments of the disclosure. The flowchart in FIG. 21 represents a process 2100 implemented on control circuitry 404 for updating an estimated amount of time required to play back a media asset based on network conditions according to an embodiment of the disclosure. It should be noted that process 2100 or any action thereof could be performed on, or provided by, any of the devices shown in FIGS. 4-5. For example, process 2100 may be executed by control circuitry 404 (FIG. 4) as instructed by a media guidance application implemented on a user device (e.g., user equipment devices 502, 504, and/or 506 (FIG. 5)) in order to update an estimated amount of time required to play back a media asset based on network conditions. In addition, one or more actions of process 2100 may be incorporated into or combined with one or more actions of any other process or embodiment described herein.

At 2102, control circuitry 404 may be configured to access a network interface of the second device 100 through which the second device 100 is receiving the second media asset. For example, the second device 100 may include a modem, LAN, WAN, 3G, 4G/LTE, or other data connection module. The second device 100 may receive data comprising the second media asset through the data communication module.

At 2104, control circuitry 404 may be configured to determine, from the network interface of the second device 100, the download rate of the second media asset. For example, control circuitry 404 may access telemetry from the data connection module. For example, control circuitry 404 may determine that the second media asset is being downloaded at a rate of 1 Mbps.

At 2106, control circuitry 404 may be configured to determine the bitrate of the second media asset. For example, control circuitry 404 may access metadata related to the second media asset. The metadata of the second media asset may include an indication of the bitrate of the second media asset.

At 2108, control circuitry 404 may be configured to determine if the download rate is sufficient for uninterrupted playback of the second media asset. For example, control circuitry 404 may compare the download rate of the second media asset with the bitrate of the second media asset. If the download rate is 1 Mbps, and the bitrate of the second media asset is 500 kbps, half the download rate, then control circuitry 404 may determine that the download rate is sufficient for uninterrupted playback of the second media asset. However, if, for example, the bitrate of the second media asset is 2 Mbps while the download rate is only 1 Mbps, then control circuitry 404 may determine that the download rate is not sufficient for uninterrupted playback of the second media asset.

At 2110, control circuitry 404 may be configured to calculate an estimated amount of additional time required for playback of the second media asset. For example, based on the download rate, control circuitry 404 may calculate an amount of time required to download a segment of the second media asset. A segment may be a temporal unit, such as one second of media, a data unit, such as a megabyte, or a media unit, such as a video frame or group of frames. Control circuitry 404 may then multiply the amount of time required to download a segment of the second media asset by the number of such segments in the second media asset to determine an estimated amount of additional time required to play back the second media asset in its entirety.

At 2112, control circuitry 404 may be configured to combine the estimated amount of additional time with the length of the second media asset. For example, control circuitry 404 may add the estimated additional amount of time to the length of the second media asset.

It is contemplated that the actions or descriptions of FIG. 21 may be used with any other embodiment of this disclosure. In addition, the actions and descriptions described in relation to FIG. 21 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 21.

Figure 22:
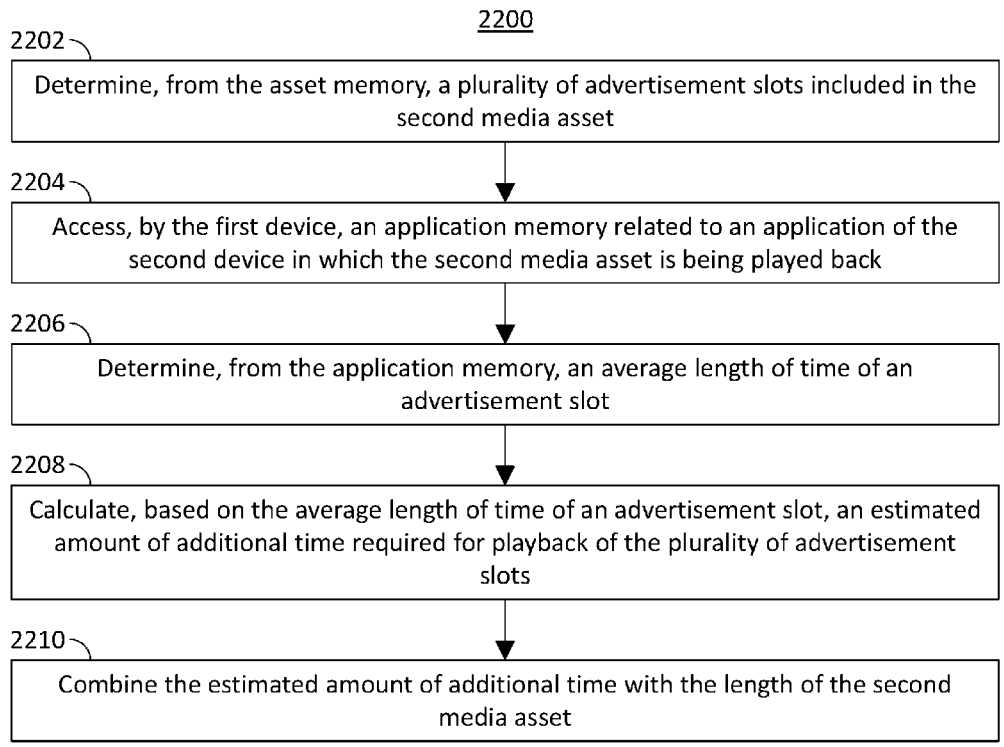
FIG. 22 is a flowchart representing a process for updating an estimated amount of time required to play back a media asset based on a length of advertisements according to an embodiment of the disclosure.

FIG. 22 is a flowchart representing an illustrative process for updating an estimated amount of time required to play back a media asset based on a length of advertisements in accordance with some embodiments of the disclosure. The flowchart in FIG. 22 represents a process 2200 implemented on control circuitry 404 for updating an estimated amount of time required to play back a media asset based on a length of advertisements according to an embodiment of the disclosure. It should be noted that process 2200 or any action thereof could be performed on, or provided by, any of the devices shown in FIGS. 4-5. For example, process 2200 may be executed by control circuitry 404 (FIG. 4) as instructed by a media guidance application implemented on a user device (e.g., user equipment devices 502, 504, and/or 506 (FIG. 5)) in order to update an estimated amount of time required to play back a media asset based on a length of advertisements. In addition, one or more actions of process 2200 may be incorporated into or combined with one or more actions of any other process or embodiment described herein.

At 2202, control circuitry 404 may be configured to determine, from the asset memory of the second device 100, a plurality of advertisement slots included in the second media asset. For example, the memory of the second device 100 related to the second media asset may include metadata of the second media asset containing indications of advertisement slots within the second media asset. The metadata may include a list, array, or other data structure listing the number of advertisement slots and the playback times at which each advertisement slot is positioned.

At 2204, control circuitry 404 may be configured to access an application memory of the second device 100 related to the application of the second device 100 in which the second media asset is being played back. For example, control circuitry 404 may access a memory location of the second device 100 related to the YouTube® application through which the user is watching the second media asset.

At 2206, control circuitry 404 may be configured to determine, from the application memory, an average length of time of an advertisement slot. For example, the application memory of the YouTube® application may include a log file or other data relating to past advertisements shown to the user during other media assets, and may include the duration of each advertisement. Control circuitry 404 may use the data relating to past advertisements to calculate an average time of an advertisement slot.

At 2208, control circuitry 404 may be configured to calculate, based on the average length of time of an advertisement slot, an estimated amount of additional time required for playback of the plurality of advertisement slots. For example, control circuitry 404 may multiply the average length of time of an advertisement slot by the number of advertisement slots indicated in the metadata related to the second media asset retrieved from memory of the second device 100.

At 2210, control circuitry 404 may be configured to combine the estimated amount of additional time with the length of the second media asset. For example, control circuitry 404 may add the estimated additional amount of time to the length of the second media asset.

It is contemplated that the actions or descriptions of FIG. 22 may be used with any other embodiment of this disclosure. In addition, the actions and descriptions described in relation to FIG. 22 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 22.

Figure 23:
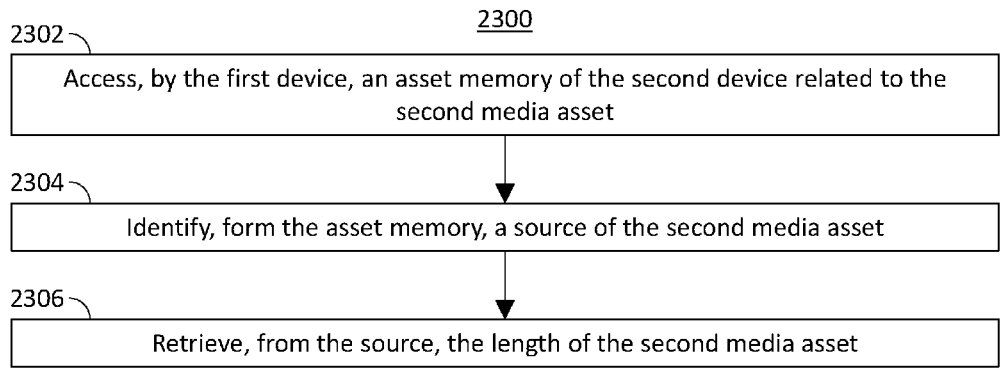
FIG. 23 is a flowchart representing another process for determining the length of time required to play back a media asset according to an embodiment of the disclosure.

FIG. 23 is a flowchart representing an illustrative process for determining the length of time required to play back a media asset in accordance with some embodiments of the disclosure. The flowchart in FIG. 23 represents a process 2300 implemented on control circuitry 404 for determining the length of time required to play back a media asset according to an embodiment of the disclosure. It should be noted that process 2300 or any action thereof could be performed on, or provided by, any of the devices shown in FIGS. 4-5. For example, process 2300 may be executed by control circuitry 404 (FIG. 4) as instructed by a media guidance application implemented on a user device (e.g., user equipment devices 502, 504, and/or 506 (FIG. 5)) in order to determine the length of time required to play back a media asset. In addition, one or more actions of process 2300 may be incorporated into or combined with one or more actions of any other process or embodiment described herein.

At 2302, control circuitry 404 may be configured to access an asset memory of the second device 100 related to the second media asset. This may be accomplished using methods described above with reference to FIG. 20.

At 2304, control circuitry 404 may be configured to identify, from the asset memory, a source of the second media asset. For example, control circuitry 404 may retrieve from the asset memory a URL or other pointer for the media asset.

At 2306, control circuitry 404 may be configured to retrieve, from the source, the length of the second media asset. For example, control circuitry 404 may access a YouTube® server location identified from the asset memory and retrieve metadata of the second media asset from the server location. The metadata retrieved from the server location may indicate the length of the second media asset.

It is contemplated that the actions or descriptions of FIG. 23 may be used with any other embodiment of this disclosure. In addition, the actions and descriptions described in relation to FIG. 23 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 23.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel.

In addition, the systems and methods described herein may be performed in real time. It should also be noted that the systems and/or methods described above may be applied to, or used in accordance with, other systems and/or methods.

What is claimed is:

1. A method comprising:
generating for display, at a first device, a media asset;
determining that a user has stopped viewing the media asset on the first device to access an application on a second device;
retrieving, from the second device, a first indication of an amount of content in the application;
retrieving, from the second device, a second indication of an average usage time for the application;
calculating an estimated usage time for the application on the second device based on the first indication and the second indication;
accessing metadata of the media asset;
determining, based on the metadata, a playback time of an important event in the media asset;
determining a threshold amount of time until playback of the important event based on the determined playback time and a current playback time;
comparing the threshold amount of time with the estimated usage time;
determining, based on the comparing, that the estimated usage time is greater than the threshold amount of time; and
in response to determining that the estimated usage time is greater than the threshold amount of time, generating for display, on the second device, an alert, the alert reminding the user to view the media asset on the first device.

2. The method of claim 1, wherein retrieving, from the second device, the first indication of an amount of content in the application comprises:
accessing, by the first device, a memory of the second device related to the application;
determining, from the memory, an amount of content added to the application within a threshold amount of time; and
retrieving, as the first indication, the determined amount of content.

3. The method of claim 1, wherein retrieving, from the second device, the second indication of the average usage time for the application comprises:
accessing, by the first device, a memory of the second device related to application usage history, the usage history including an amount of time the user used the application, and an amount of content viewed during each use;
calculating, based on the usage history, an average amount of usage time per unit of content; and
retrieving, as the second indication, the average amount of usage time per unit of content.

4. The method of claim 1, wherein determining, based on the metadata, a playback time of an important event in the media asset comprises:
accessing a database of playback times corresponding to important events in the media asset;
determining, based on the current playback time of the media asset, the next important event in the media asset in the database; and
retrieving, from the database, the playback time of the next important event.

5. The method of claim 1, wherein the user has stopped viewing the media asset on the first device in response to a notification on the second device, the method further comprising:
identifying an application associated with the notification;
accessing a database of applications, the database of applications relating each application with an application type, the application type indicating a level of importance to the user;
retrieving, from the database of applications, an application type corresponding to the identified application;
determining, based on the application type, an importance level of the identified application;
in response to determining that the importance level of the application exceeds a threshold, pausing the media asset; and
in response to the user completing use of the application, resuming playback of the media asset.

6. The method of claim 5, wherein calculating an estimated usage time for the application comprises:
accessing, by the first device, a memory of the second device related to application usage history, the usage history including an amount of time the user used each application available on the second device, and an importance level of each application available on the second device;
identifying a plurality of applications having an importance level within a threshold difference of the importance level of the identified application; and
calculating an average usage time for the plurality of applications.

7. The method of claim 1, wherein the user has stopped viewing the media asset on the first device in response to a plurality of notifications on the second device, and wherein the current playback time of the media asset corresponds to an advertisement slot, the method further comprising:
calculating an estimated usage time for each notification of the plurality of notifications;
determining, based on metadata, an amount of time until the end of the advertisement slot;
selecting a subset of notifications of the plurality of notifications having a combined estimated usage time that is less than the amount of time until the end of the advertisement slot;
displaying the subset of notifications on the second device; and
preventing display of the remainder of the plurality of notifications on the second device.

8. The method of claim 7, wherein calculating an estimated usage time for the application comprises:
accessing, by the first device, memory of the second device related to application usage history, the usage history including an amount of time the user used each application available on the second device;
identifying an application associated with each notification of the plurality of notifications; and
calculating, based on usage history, an average amount of usage time for each of the identified applications.

9. The method of claim 1, further comprising:
detecting, by the first device, new content received in the application; and
based on detecting the new content, adding an amount of time to the estimated usage time for the application.

10. The method of claim 1, wherein generating for display, on the second device, the alert further comprises:

calculating, based on the playback time of the important event, an alert time, the alert time being an earlier time than the playback time of the important event;

monitoring, by the first device, a real-time clock; and determining, by the first device, based on the monitoring, that the alert time has arrived.

11. A system comprising:

a first device comprising control circuitry configured to:

generate for display, at the first device, a media asset;

determine that a user has stopped viewing the media asset on the first device to access an application on a second device;

retrieve, from the second device, a first indication of an amount of content in the application;

retrieve, from the second device, a second indication of an average usage time for the application;

calculate an estimated usage time for the application on the second device based on the first indication and the second indication;

access metadata of the media asset;

determine, based on the metadata, a playback time of an important event in the media asset;

determine a threshold amount of time until playback of the important event based on the determined playback time and a current playback time;

compare the threshold amount of time with the estimated usage time;

determine, based on the comparing, that the estimated usage time is greater than the threshold amount of time; and in response to determining that the estimated usage time is greater than the threshold amount of time, generate for display, on the second device, an alert, the alert reminding the user to view the media asset on the first device.

12. The system of claim 11, wherein the control circuitry configured to retrieve, from the second device, the first indication of an amount of content in the application is further configured to:

access a memory of the second device related to the application;

determine, from the memory, an amount of content added to the application within a threshold amount of time; and retrieve, as the first indication, the determined amount of content.

13. The system of claim 11, wherein the control circuitry configured to retrieve, from the second device, the second indication of the average usage time for the application is further configured to:

access, by the first device, a memory of the second device related to application usage history, the usage history including an amount of time the user used the application, and an amount of content viewed during each use;

calculate, based on the usage history, an average amount of usage time per unit of content; and retrieve, as the second indication, the average amount of usage time per unit of content.

14. The system of claim 11, wherein the control circuitry configured to determine, based on the metadata, a playback time of an important event in the media asset is further configured to:

access a database of playback times corresponding to important events in the media asset;

determine, based on the current playback time of the media asset, the next important event in the media asset in the database; and retrieve, from the database, the playback time of the next important event.

15. The system of claim 11, wherein the user has stopped viewing the media asset on the first device in response to a notification on the second device, the control circuitry being further configured to:

identify an application associated with the notification;

access a database of applications, the database of applications relating each application with an application type, the application type indicating a level of importance to the user;

retrieve, from the database of applications, an application type corresponding to the identified application;

determine, based on the application type, an importance level of the identified application;

in response to determining that the importance level of the application exceeds a threshold, pause the media asset; and in response to the user completing use of the application, resume playback of the media asset.

16. The system of claim 15, wherein the control circuitry configured to calculate an estimated usage time for the application is further configured to:

access, by the first device, a memory of the second device related to application usage history, the usage history including an amount of time the user used each application available on the second device, and an importance level of each application available on the second device;

identify a plurality of applications having an importance level within a threshold difference of the importance level of the identified application; and calculate an average usage time for the plurality of applications.

17. The system of claim 11, wherein the user has stopped viewing the media asset on the first device in response to a plurality of notifications on the second device, and wherein the current playback time of the media asset corresponds to an advertisement slot, the control circuitry being further configured to:

calculate an estimated usage time for each notification of the plurality of notifications;

determine, based on metadata, an amount of time until the end of the advertisement slot;

select a subset of notifications of the plurality of notifications having a combined estimated usage time that is less than the amount of time until the end of the advertisement slot;

display the subset of notifications on the second device; and prevent display of the remainder of the plurality of notifications on the second device.

18. The system of claim 17, wherein the control circuitry configured to calculate an estimated usage time for the application is further configured to:

access, by the first device, memory of the second device related to application usage history, the usage history including an amount of time the user used each application available on the second device;

identify an application associated with each notification of the plurality of notifications; and calculate, based on usage history, an average amount of usage time for each of the identified applications.

19. The system of claim 11, wherein the control circuitry is further configured to:
- detect, by the first device, new content received in the application; and
- based on detecting the new content, add an amount of time to the estimated usage time for the application.

20. The system of claim 11, wherein the control circuitry configured to generate for display, on the second device, the alert is further configured to:
- calculate, based on the playback time of the important event, an alert time, the alert time being an earlier time than the playback time of the important event;
- monitor, by the first device, a real-time clock; and
- determine, by the first device, based on the monitoring, that the alert time has arrived.

* * * * *